(12) United States Patent
Torgersrud

(10) Patent No.: US 9,699,157 B2
(45) Date of Patent: Jul. 4, 2017

(54) METHOD AND SYSTEM FOR MEDIA CATALOGING FOR EXCHANGE IN CONTROLLED FACILITIES

(71) Applicant: Telmate LLC, San Francisco, CA (US)

(72) Inventor: Richard Torgersrud, San Francisco, CA (US)

(73) Assignee: Intelmate LLC, San Francisco, CA (US)

( * ) Notice: Subject to any disclaimer, the term of this patent is extended or adjusted under 35 U.S.C. 154(b) by 357 days.

(21) Appl. No.: 13/844,554

(22) Filed: Mar. 15, 2013

(65) Prior Publication Data
US 2014/0282898 A1 Sep. 18, 2014

(51) Int. Cl.
*H04L 29/06* (2006.01)

(52) U.S. Cl.
CPC ............ *H04L 63/08* (2013.01); *H04L 63/104* (2013.01)

(58) Field of Classification Search
CPC ............................. H04L 63/08; H04L 63/104
USPC .............................................................. 726/4
See application file for complete search history.

(56) References Cited

U.S. PATENT DOCUMENTS

| | | | |
|---|---|---|---|
| 7,647,398 B1 * | 1/2010 | Fan | 709/224 |
| 7,742,582 B2 * | 6/2010 | Harper | 379/100.08 |
| 7,797,345 B1 * | 9/2010 | Martino | G06F 17/30867 707/792 |
| 8,359,642 B1 * | 1/2013 | Wurtenberger et al. | 726/7 |
| 8,370,206 B2 * | 2/2013 | Collins | G06Q 10/00 705/26.1 |
| 8,516,568 B2 * | 8/2013 | Cohen | 726/12 |
| 2005/0022229 A1 * | 1/2005 | Gabriel et al. | 725/28 |
| 2006/0095251 A1 * | 5/2006 | Shaw | 704/9 |
| 2006/0161604 A1 * | 7/2006 | Lobo | G06F 17/30067 |
| 2007/0106959 A1 * | 5/2007 | McGowan | G06F 3/0227 715/848 |
| 2008/0228775 A1 * | 9/2008 | Abhyanker | G06Q 10/10 |
| 2009/0076832 A1 * | 3/2009 | Collins | G06Q 10/00 705/1.1 |
| 2009/0234827 A1 * | 9/2009 | Gercenstein et al. | 707/5 |
| 2010/0063879 A1 * | 3/2010 | Araradian | G06Q 30/0255 705/14.53 |
| 2010/0299761 A1 * | 11/2010 | Shapiro | 726/28 |
| 2011/0047473 A1 * | 2/2011 | Hanna et al. | 715/740 |
| 2011/0078242 A1 * | 3/2011 | Davi | G06F 17/3089 709/204 |
| 2012/0222061 A1 * | 8/2012 | Anthru | H04N 5/44543 725/28 |

(Continued)

*Primary Examiner* — Matthew Henning
(74) *Attorney, Agent, or Firm* — Osha Liang LLP

(57) ABSTRACT

In general, in one aspect, the invention relates to a method for reviewing a posting to a secure social network (SSN). The method includes receiving a first media item from a SSN member, evaluating the first media item to identify a first media attribute, and receiving a request to access the first media item from an inmate of a controlled facility. The method further includes retrieving a set of restricted attributes corresponding to the inmate, and determining whether the inmate is allowed to access the media item based on comparing the first media attribute to the set of restricted attributes. When the inmate is allowed to access the media item, granting the inmate access to the media item based on the first determination. When the inmate is not allowed to access the media item, denying the inmate access to the media item based on the first determination.

20 Claims, 13 Drawing Sheets

(56) References Cited

U.S. PATENT DOCUMENTS

| | | | |
|---|---|---|---|
| 2012/0257583 A1* | 10/2012 | Keiser et al. | 370/329 |
| 2013/0031598 A1* | 1/2013 | Whelan | G01S 1/725 |
| | | | 726/1 |
| 2013/0067595 A1* | 3/2013 | Pierre | G06F 21/6218 |
| | | | 726/28 |
| 2013/0152157 A1* | 6/2013 | Coletrane | G06F 21/00 |
| | | | 726/1 |
| 2013/0179949 A1* | 7/2013 | Shapiro | 726/4 |
| 2013/0239217 A1* | 9/2013 | Kindler | G06F 17/30958 |
| | | | 726/25 |
| 2013/0297706 A1* | 11/2013 | Arme | G06F 17/30038 |
| | | | 709/206 |
| 2014/0280570 A1* | 9/2014 | Sutton | G06Q 50/01 |
| | | | 709/204 |

* cited by examiner

METHOD AND SYSTEM FOR MEDIA CATALOGING FOR EXCHANGE IN CONTROLLED FACILITIES

CROSS-REFERENCE TO RELATED APPLICATIONS

This application is related to U.S. patent application Ser. No. 13/438,940 filed on Apr. 4, 2012, entitled "Secure Social Network." U.S. patent application Ser. No. 13/438,940 is incorporated by reference in its entirety.

BACKGROUND

Controlled facilities, such as a jail, prison, secure detention environments, detention facility, secured hospital, or addiction treatment facility, house large populations of individuals in confinement, which presents unique administrative challenges. In such detention environments, detained individuals, such as prisoners, offenders, convicts, military personnel, patients, government cleared personnel, or other detainees, frequently desire to communicate with individuals outside the detention environment such as friends or family members.

SUMMARY

In general, in one aspect, the invention relates to a method for reviewing a posting to a secure social network (SSN). The method includes receiving a first media item from a SSN member, evaluating the first media item to identify a first media attribute, and receiving a request to access the first media item from an inmate of a controlled facility. The method further includes retrieving a set of restricted attributes corresponding to the inmate, and determining whether the inmate is allowed to access the media item based on comparing the first media attribute to the set of restricted attributes. When the inmate is allowed to access the media item, granting the inmate access to the media item based on the first determination. When the inmate is not allowed to access the media item, denying the inmate access to the media item based on the first determination.

In general, in one aspect, the invention relates to a non-transitory computer readable medium comprising instructions that, when executed by a processor, perform a method for reviewing a posting to a secure social network (SSN). The method includes receiving a first media item from a SSN member, evaluating the first media item to identify a first media attribute, and receiving a request to access the first media item from an inmate of a controlled facility. The method further includes retrieving a set of restricted attributes corresponding to the inmate, and determining whether the inmate is allowed to access the media item based on comparing the first media attribute to the set of restricted attributes. When the inmate is allowed to access the media item, granting the inmate access to the media item based on the first determination. When the inmate is not allowed to access the media item, denying the inmate access to the media item based on the first determination.

In general, in one aspect, the invention relates to a system for reviewing a posting to a secure social network (SSN). The system includes a database server and an application server. The database server includes a set of restricted attributes corresponding to an inmate of a controlled facility. The application server includes an evaluation module and a content dissemination module. The evaluation module is configured to receive a first media item from a SSN member, and evaluate the first media item to identify a first media attribute. The content dissemination module is configured to receive a request to access the first media item from an inmate of a controlled facility, retrieve a set of restricted attributes corresponding to the inmate, and determine whether the inmate is allowed to access the media item based on comparing the first media attribute to the set of restricted attributes. When the inmate is allowed to access the media item, grant the inmate access to the media item based on the first determination. When the inmate is not allowed to access the media item, deny the inmate access to the media item based on the first determination.

Other aspects of the invention will be apparent from the following description and the appended claims.

DETAILED DESCRIPTION

Figure 1:
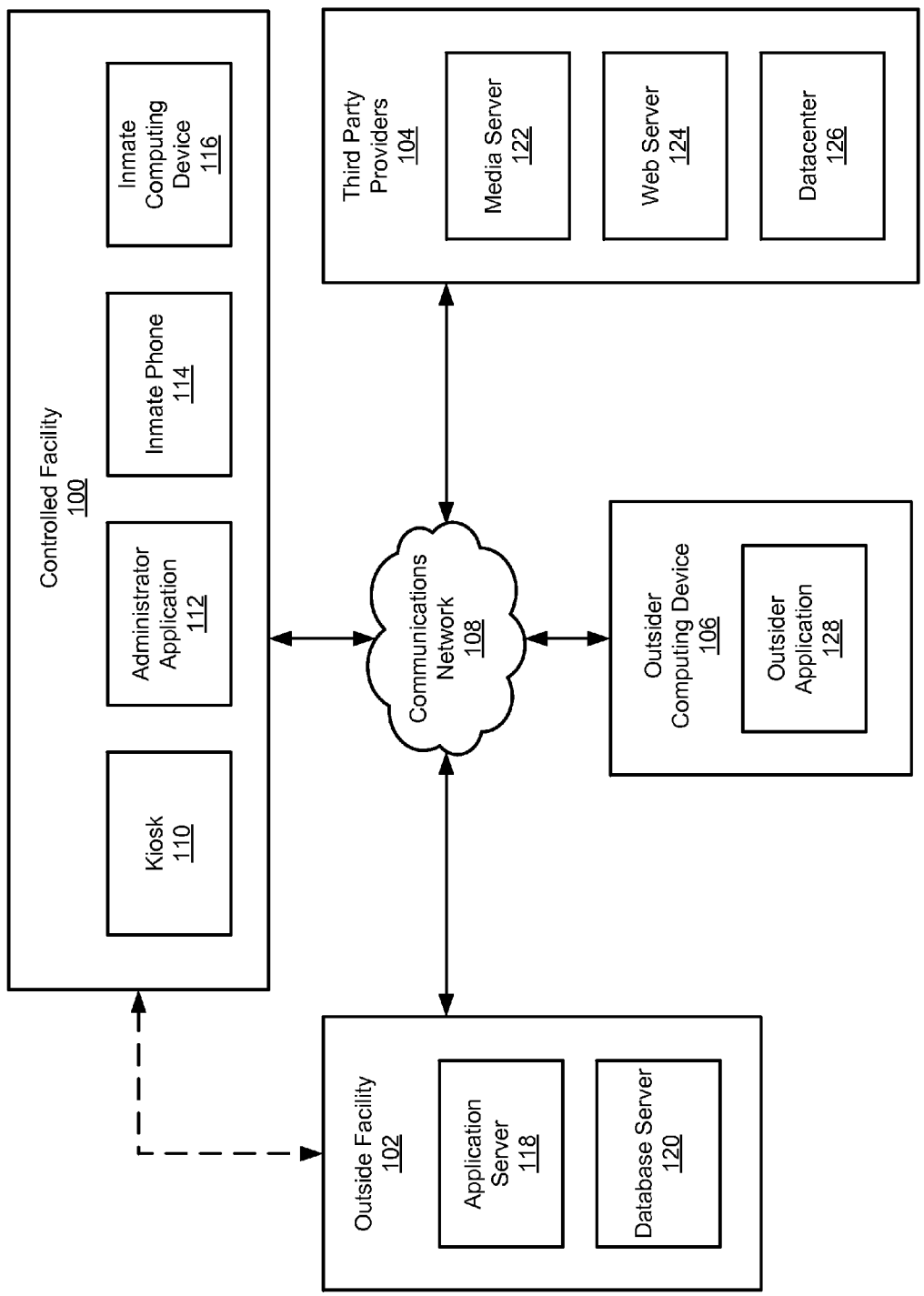
FIG. 1 shows a diagram of a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for facilitating communication between inmates in a controlled facility and outsiders. Specifically, embodiments of the invention may be used to evaluate posts made to a secure social network, and determine which members of the secure social network should be granted access to the posts.

Embodiments of the invention may include interactions with a secure social network. In one or more embodiments of the invention, a secure social network is a network application that facilitates and secures the exchange or transmission of information between two or more parties in which at least one of those parties is subject to special security or law enforcement restrictions or otherwise is subject to the controls of a controlled facility. Exchanged or transmitted information may be member generated, such as a photo or a video message, or it may be member-curated, such as a news headline, a famous quote, or a sports score.

FIG. 1 shows a diagram of a system in accordance with one or more embodiments of the invention. As shown in FIG. 1, the system includes a controlled facility (100), an outside facility (102), third party providers (104), and an outsider computing device (106) each communicatively coupled to a communications network (108). The controlled facility (100) may include, but is not limited to, a kiosk (110), an administrator application (112), an inmate phone (114), and an inmate computing device (116). The outside facility (102) may include an application server (118) and a database server (120). The third party providers (104) may include a media server (122), a web server (124), and a datacenter (126). The outsider computing device (106) may include an outsider application (128).

In one or more embodiments of the invention, a controlled facility (100) is an access-restricted location. Examples of controlled facilities (e.g., controlled facility (100)) include, but are not limited to, detention environments (e.g., jails, prisons, etc.), immigration detention centers, military centers, government secure sites, law enforcement holding structures, secure business complexes, and psychiatric hospitals.

In one or more embodiments of the invention, an inmate is a person within a controlled facility (100) who is subject to one or more restrictions, primarily to his or her freedom or rights. Examples of inmates include, but are not limited to, prisoners, wards of the state, parolees, employees working in a secure business complex, temporary or long-term internees, patients, military personnel, uncharged suspects, and refugees. Inmate restrictions may be part of a court-imposed sentence on an inmate, while others may be specific to the controlled facility (100) of the inmate. Restrictions may include limitations on an inmate's physical movement (i.e., physical restrictions) and limitations on the inmate's ability to communicate (i.e., communication restrictions). Communication restrictions include inmate use restrictions, inmate target restrictions, and device use restrictions.

In one or more embodiments of the invention, inmate use restrictions are limitations on an inmate's general ability to communicate with visitors and/or outsiders. Inmate use restrictions may include, for example, periods of time in which an inmate is not allowed to communicate with outsiders or visitors (e.g., between 10 PM and 8 AM, during an imposed one-week punitive period, etc.) and limitations based on lack of funds (e.g., insufficient commissary or communication account balance to initiate a communication).

In one or more embodiments of the invention, inmate target restrictions are limitations on the target or source of a communication with the inmate. Inmate target restrictions may be specific outsiders or visitors with whom the inmate is not allowed to communicate (e.g., the victim of a crime perpetrated by the inmate, etc.). Inmate target restrictions may also include types of people with whom the inmate is not allowed contact (e.g., outsiders who are ex-cons, minors under the age of 18, etc.).

In one or more embodiments of the invention, device use restrictions are restrictions based on the condition or state of the communication device used by the inmate. Device use restrictions include, for example, limitations based on the location of the inmate's mobile device, limitations imposed based on a determination that the device has been tampered with, etc.

In one or more embodiments of the invention, an outsider is a person outside the controlled facility (100) who may be the source or target of a communication with an inmate. An outsider who enters the controlled facility (100) for the purpose of communicating with an inmate is referred to as a visitor.

In one or more embodiments of the invention, the kiosk (110) is a computing system with functionality to facilitate communication between an inmate and a visitor or outsider. Such communication facilitation may include creating a system identity data item or secure social networking account, adding or importing contact information for outsiders with whom the inmate wishes to communicate, uploading media (e.g., photos, videos, audio, and text) to, or viewing media from, a secure social network, sending or receiving messages or other media, acting as an endpoint for voice and video communication between an inmate and a visitor or outsider, scheduling a communication, and managing a commissary or communication account. Further detail about kiosks (e.g., kiosk (110)) is provided in FIG. 2, FIG. 5A, FIG. 5B, and FIG. 6.

In one or more embodiments of the invention, the administrator application (112) is a process or group of processes executing on a computing system with functionality to enable an administrator to create, remove, and/or enforce one or more restrictions on an inmate, visitor, outsider, or device. In one or more embodiments of the invention, an administrator is a person associated with the controlled facility charged with enforcing one or more restrictions. Examples of administrators include, but are not limited to, prison guards, orderlies, wardens, prison staff, jailers, information technology technicians, system administrators, and law enforcement agents. Using the administrator application, an administrator may retrieve or alter the identity data item and/or secure social network account of an inmate, visitor, or outsider. Further detail about the administrator application (112) is provided in FIG. 2.

In one or more embodiments of the invention, the inmate phone (114) is a device with functionality to send and receive audio communications between an inmate and an outsider or visitor. In one or more embodiments of the invention, the inmate phone (114) is a stationary (i.e., non-mobile) device. Further, a single inmate phone (114) may be used by more than one inmate. Further detail about the inmate phone (114) is provided in FIG. 2.

In one or more embodiments of the invention, the inmate computing device (116) is a computing device with functionality to enable an inmate to communicate with a visitor or outsider. Specifically, the inmate computing device (116) may be used to send or receive text messages and/or initiate or receive voice or video calls. In one or more embodiments of the invention, the inmate computing device (116) also enables an inmate to access a secure social network. Specifically, the inmate computing device (116) may be used to upload media to, or view media from, a secure social network account of the inmate or another secure social network member. In one or more embodiments of the invention, the inmate computing device (116) is a mobile computing device (e.g., a smartphone, a laptop, a tablet, etc.). Further detail about the inmate computing device (116) is provided in FIG. 2 and FIG. 6.

In one or more embodiments of the invention, the elements within the controlled facility (100) are communicatively coupled to the communications network (108). In one or more embodiments of the invention, the communications network (108) is a collection of computing systems and other hardware interconnected by communication channels. The communications network (108) may include networks that are exclusively or primarily used for a single type of communication, such as a telephone network (e.g., Plain Old Telephone System (POTS)), and/or networks used for a wide array of communication types, such as the Internet through Voice over IP (VOIP). Communication channels used by the communications network (108) may include, for example, telephone lines, networking cables, wireless signals, radio waves, etc. Fees charged and payments received by the provider(s) of the communications network (108) may involve multiple parties, including a service provider of the outside facility (102), the management of the controlled facility (100), and provider(s) of the communications network (108). In one or more embodiments of the invention, fees may be split between multiple parties based on the terms of underlying agreements or contracts between the parties. Further, rebates, reimbursements, and/or refunds may be afforded to and paid to the management of the controlled facility (100) based on the terms of underlying agreements or contracts between the parties. For example, the management of the controlled facility (100) may receive a rebate from the service provider of the services provided to inmates based on such factors as the volume of use, the dollar amount, and/or the frequency of use.

In one or more embodiments of the invention, the outside facility (102) is a group of computing systems located outside of the controlled facility (100). Specifically, the outside facility (102) may house system elements with functionality to facilitate communication between inmates and outsiders, access communication data between inmates and outsiders, and enforce one or more restrictions imposed on inmates and inmate communications. In one or more embodiments of the invention, the outside facility (102) is connected directly to the controlled facility (100) bypassing a generally accessible communications network (communications network (108)). One or more of the components within the outside facility (102) may alternatively be located within the controlled facility (100) or within the third party providers (104).

In one or more embodiments of the invention, the application server (118) is a computing system with functionality to authenticate an inmate, outsider, administrator, reviewer, or investigator for access to system functionality (e.g., initiating voice or video calls, sending text messages, etc.) or data stored on the database server (120) (e.g., inmate identities, communications between inmates and outsiders, etc.). The application server may authenticate inmates, outsiders, administrators, reviewers, and/or investigators using passwords, biometric data, digital access codes, and/or physical access devices. Further detail about the application server (118) is provided in FIG. 3.

In one or more embodiments of the invention, the database server (120) is a computing system with functionality to store identities used to authenticate inmates, outsiders, administrators, reviewers, and/or investigators. Such identities may include verified data used to compare to verification data provided by the inmate, outsider, administrator, reviewer, or investigator to authenticate the inmate, outsider, administrator, reviewer, or investigator.

In one or more embodiments of the invention, the database server (120) also stores communication data about communications between an inmate and an outsider or visitor. Such communication data may include, for example, a recording of a video call, the length of a voice call, the frequency of video calls, sent and received text messages, etc. The database server (120) may also store media submitted to a secure social network before, during, and/or after the media has been reviewed. Further detail about the database server (120) is provided in FIG. 3.

In one or more embodiments of the invention, the third party providers (104) are computing systems that provide network application and data storage services (i.e., cloud computing services). Third party providers (104) may include service providers used directly by inmates and outsiders, such as photo sharing services, general social networking sites, and digital music retailers. Third party providers (104) may include service providers employed by administrators and for use by inmates and outsiders, such as audio and video streaming applications, conferencing applications, and secure social network media storage. One or more of the components within the third party providers (104) may alternatively be located within the controlled facility (100) or the outside facility (102).

In one or more embodiments of the invention, the media server (122) is a computing system or group of computing system with functionality to provide network application services to facilitate communication between an inmate and an outsider, and to facilitate access to a secure social network. Such services include, but are not limited to, VoIP services, video conferencing services, and media streaming services.

In one or more embodiments of the invention, the web server (124) is a computing system or group of computing system with functionality to provide an interface to access and interact with webpages and other network application services. In one or more embodiments of the invention, the web server (124) is a type of media server (122).

In one or more embodiments of the invention, the datacenter (126) is a computing system or group of computing system with functionality to provide an interface to access and interact with data stored on one or more data servers (not shown). In one or more embodiments of the invention, the datacenter (126) is a type of media server (122).

In one or more embodiments of the invention, the outsider computing device (106) is a computing device with functionality to execute the outsider application (128). In one or more embodiments of the invention, the outsider computing device (106) is a mobile computing device (e.g., a smartphone, a laptop, a tablet, etc.). Further detail about the outsider computing device (106) is provided in FIG. 6.

In one or more embodiments of the invention, the outsider application (128) is a process or group of processes (in software, firmware, hardware, or combination thereof) with functionality to enable communication between an outsider and an inmate. Specifically, the outsider application (128) may be used to send or receive text messages and/or initiate or receive voice or video calls. In one or more embodiments of the invention, the outsider application (128) also enables an outsider to access a secure social network. Specifically, the outsider application (128) may be used to upload media to, or view media from, a secure social network account of the outsider, an inmate, other secure social network member.

Figure 2:
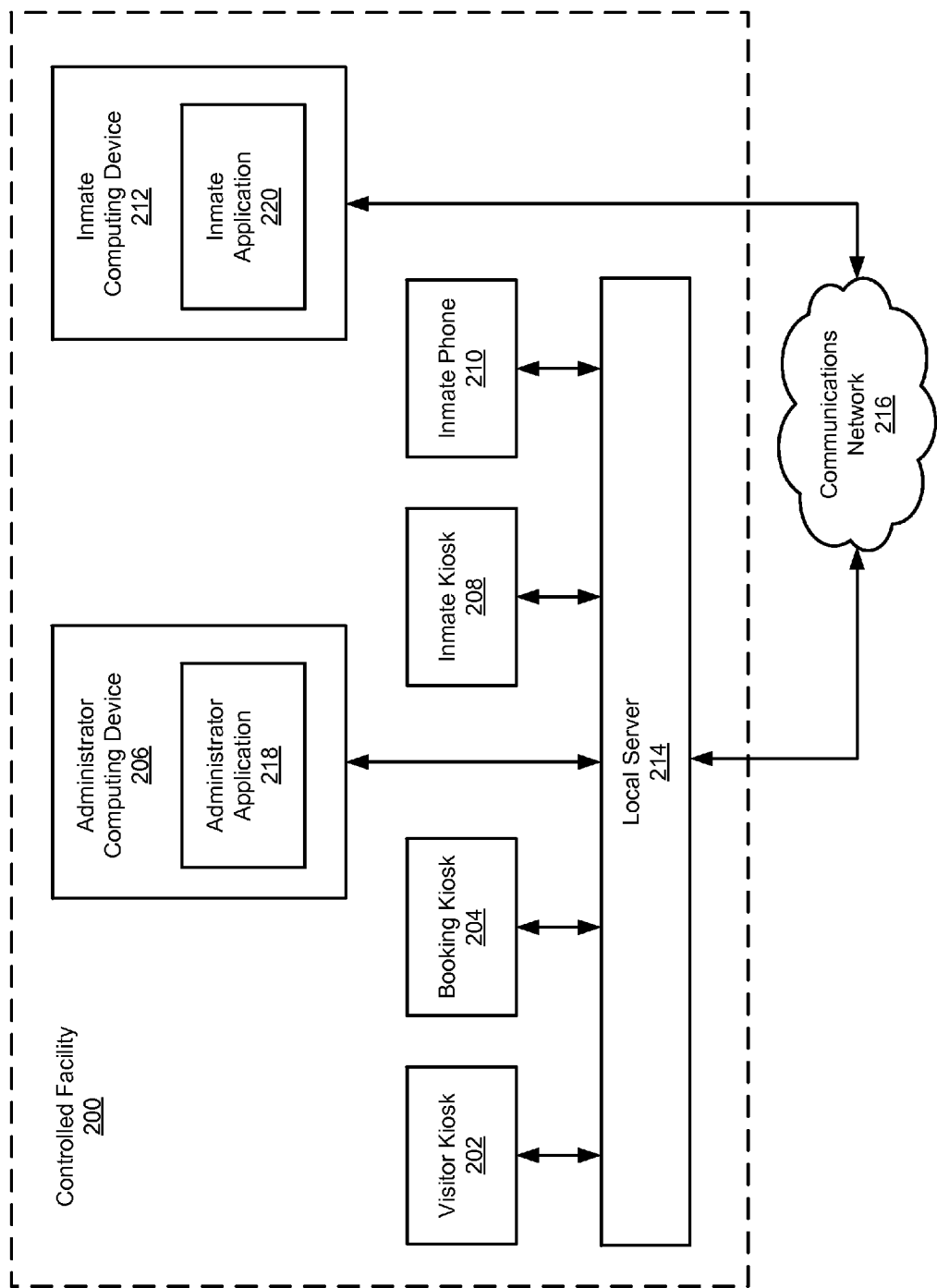
FIG. 2 shows a diagram of a controlled facility in accordance with one or more embodiments of the invention.

FIG. 2 shows a controlled facility in accordance with one or more embodiments of the invention. As shown in FIG. 2, the controlled facility (200) may include a visitor kiosk (202), a booking kiosk (204), an administrator computing device (206), an inmate kiosk (208), an inmate phone (210), an inmate computing device (212), and a local server (214). The inmate computing device (212) and the local server (214) are communicatively coupled to the communications network (216). The administrator computing device (206)

includes an administrator application (218). The inmate computing device (212) includes an inmate application (220).

In one or more embodiments of the invention, the visitor kiosk (202) is a computing system with functionality to facilitate communication between an inmate and a visitor. Specifically, the visitor kiosk (202) may be a combination of computing hardware and software used by a visitor to make and receive voice and video calls to/from an inmate in the same controlled facility (200) or another controlled facility (not shown). The visitor kiosk (202) may also be used to schedule a voice or video call with an inmate for a future date. Further, the visitor kiosk (202) may also include the functionality to exchange media (e.g., photos, videos, and audio) with an inmate in the controlled facility (200). The visitor kiosk (202) may include functionality to generate such media, such as a camera, microphone, keyboard, and software to record or otherwise create media to send to an inmate. Such media may be subject to review before being delivered.

In one or more embodiments of the invention, a visitor wanting to use a visitor kiosk (202) may be required to participate in an authentication process to verify the identity of the visitor. The authentication process may include creating an identity data item and verified data for storage and later comparison. The verified data used for authentication may be a username and password combination and/or biometric information about the visitor.

In one or more embodiments of the invention, the visitor kiosk (202) includes functionality to access a secure social network. Specifically, the visitor kiosk (202) may be used by a visitor to create and manage a secure social network account. The visitor kiosk (202) may also be used by a visitor to upload digital media to the visitor's secure social network account or the account of another secure social network member. The visitor kiosk (202) may further be used to view digital media uploaded to the visitor's social network account or the account of another secure social network member.

In one or more embodiments of the invention, the visitor kiosk (202) includes functionality to manage a commissary account for one or more inmates. Specifically, a visitor may use a visitor kiosk (202) to add money to the commissary account of an inmate in the controlled facility (200), view a transaction history of the commissary account, transfer funds between commissary accounts, and/or remove funds from a commissary account. Further detail about the visitor kiosk (202) is provided in FIG. 5A and FIG. 5B.

In one or more embodiments of the invention, the booking kiosk (204) is a computing system with functionality to aid administrators in admitting an inmate into a controlled facility (e.g., controlled facility (200)). Specifically, the booking kiosk (204) may include functionality to create or update an inmate identity data item. Specifically, the booking kiosk (204) may be used to obtain verified data (e.g., passwords, biometric data, etc.) and save the verification data in one or more identity data items for the inmate. The verified data may then be used to authenticate the inmate (e.g., to access the communications network (216), etc.). In one or more embodiments of the invention, the booking kiosk may also be used to associate one or more restrictions with the inmate via the inmate's identity data item.

In one or more embodiments of the invention, the booking kiosk (204) includes functionality to input contact information for visitors, outsiders, administrators, or other inmates with whom the inmate wants to communicate. Such contact information may then be associated with the inmate's identity data item, and may be used to initiate a voice or video call, or otherwise transmit media to visitors, outsiders, or other inmates. Further, in one or more embodiments of the invention, the contact information may be retrieved from an inmate's mobile computing device (e.g., cell phone, smart phone, etc.) or a local or remote data storage device (e.g., a flash drive, a webmail account, etc.). The contact information may be retrieved using a wired or wireless connection between the booking kiosk and the inmate's mobile computing device and/or the data storage device. The contact information may be subject to review before the inmate is permitted to contact the visitor, outsider, administrator, or other inmate.

In one or more embodiments of the invention, the booking kiosk (204) includes functionality to prepare a mobile computing device for use by the inmate within the controlled facility (200). Specifically, a controlled facility (200) may allow inmates the use of computing devices while in or subject to the controlled facility (200). However, use of such inmate computing devices may require that the computing device is instrumented with software restricting the use of the inmate computing device. The booking kiosk (204) may be used to instrument the inmate computing device as required. Further detail about the booking kiosk (204) is provided in FIG. 5A and FIG. 5B.

In one or more embodiments of the invention, the administrator computing device (206) is a computing system or group of computing systems with functionality to execute the administrator application (218). In one or more embodiments of the invention, the administrator application (218) is a process or group of process with functionality to provide access to communications between inmates at the controlled facility (200) and visitors, outsiders, administrators, and other inmates. The administrator application (218) may also be used to monitor current voice or video calls between an inmate and a visitor, outsider, administrator, or other inmate.

In one or more embodiments of the invention, the administrator application (218) is used to manage an identity data item associated with an inmate. Such management may include altering the restrictions (device use restrictions, inmate use restrictions, and inmate target restrictions) applicable to the inmate. In one or more embodiments of the invention, the administrator application (218) is used to access the secure social network account of an inmate, visitor, or outsider. In one or more embodiments of the invention, the administrator application (218) may provide heightened access (i.e., a level of access greater than that of the inmate, visitor, or outsider) to data stored in the secure social networking account.

In one or more embodiments of the invention, the inmate kiosk (208) is a computing system with functionality to facilitate communication between an inmate and a visitor or outsider. Specifically, the inmate kiosk (208) may be a combination of computing hardware and software used by an inmate to make and receive voice and video calls to/from a visitor, outsider, or another inmate in another controlled facility (not shown). The inmate kiosk (208) may also be used to schedule a voice or video call with a visitor at a future date. Initiating or scheduling a voice or video call may include determining whether the currently attempted call or the scheduled call are adverse to one or more restrictions (e.g., inmate use restrictions, device use restrictions, and/or inmate target restrictions). Further, the inmate kiosk (208) may also include the functionality to exchange media (e.g., photos, videos, and audio) with a visitor or outsider. The inmate kiosk (208) may include functionality to generate such media, such as a camera, microphone, keyboard, and software to record or otherwise create media to send to a visitor or outsider. Such media may be subject to review before being delivered.

In one or more embodiments of the invention, an inmate wanting to use an inmate kiosk (208) may be required to participate in an authentication process to verify the identity of the inmate. The authentication process may include providing verification data for comparison to verified data previously obtained from the inmate and stored in the inmate identity data item. The verified data may be a username and password combination and/or biometric information about the inmate.

In one or more embodiments of the invention, the inmate kiosk (208) includes functionality to access a secure social network. Specifically, the inmate kiosk (208) may be used by an inmate to manage a secure social network account. The inmate kiosk (208) may include functionality to generate such media, such as a camera, microphone, keyboard, and software to record or otherwise create media to send to a visitor or outsider. The inmate kiosk (208) may also be used by an inmate to upload digital media to the inmate's secure social network account or the account of another secure social network member. The inmate kiosk (208) may further be used to view digital media uploaded to the inmate's social network account or the account of another secure social network member. Uploaded media may be subject to review before posting.

In one or more embodiments of the invention, the inmate kiosk (208) includes functionality to manage a commissary account for the inmate. Specifically, an inmate may use an inmate kiosk (208) to view a transaction history of the commissary account and/or to apply commissary funds for goods and services consumed or enjoyed by the inmate. Further detail about the inmate kiosk (208) is provided in FIG. 5A and FIG. 5B.

In one or more embodiments of the invention, the inmate phone (210) is a device with functionality to send and receive audio communications between an inmate and an outsider or visitor. The inmate phone (210) may be implemented as handset connected to a telephone line. In one or more embodiments of the invention, all or part of the voice call may be conducted over a VoIP connection. In one or more embodiments of the invention, a single inmate phone (210) is utilized by multiple inmates.

In one or more embodiments of the invention, initiating or receiving a voice call using the inmate phone (210) requires a form of authentication (e.g., providing a password, personal identification number, or voice verification). In one or more embodiments of the invention, voice calls made using the inmate phone (210) are monitored by one or more administrators using the administrator computing device (206), and are recorded and stored in a data storage system within the controlled facility (200), within the outside facility (not shown), or within a third party provider (not shown). The inmate phone (210) may also be subject to device use restrictions limiting the ability to use the inmate phone (210) at certain times (e.g., between 9 PM and 8 AM) or under certain conditions (e.g., emergency lockdown).

In one or more embodiments of the invention, the identity of the visitor or outsider targeted by the inmate or attempting to contact the inmate using the inmate phone (210) is verified against inmate target restrictions imposed on the inmate. Such restrictions may be associated with the inmate's identity data item and may be stored locally within the controlled facility (200), within the outside facility (not shown), or within a third party provider (not shown). The visitor or outsider identity may be verified by the local server (214) or by another server within the outside facility (not shown), or within a third party provider (not shown).

In one or more embodiments of the invention, the inmate computing device (212) is a computing system configured to execute the inmate application (202). In one or more embodiments of the invention, each inmate computing device (212) is utilized exclusively by a single inmate. In one or more embodiments of the invention, access to the inmate application requires a form of initial authentication. This initial authentication may use verification data stored locally on the inmate computing device (212) (e.g., a code or combination used to unlock the phone, locally stored biometric data, etc.).

In one or more embodiments of the invention, accessing a communications network (e.g., communications network (216)) using the inmate application (220) may require further network-based authentication. This further authentication may use verification data stored external to the inmate computing device (212) but locally within the controlled facility (200), or remotely within the outside facility (not shown) or within a third party provider (not shown).

In one or more embodiments of the invention, an authenticated inmate may use the inmate application to initiate or receive voice or video calls, initiate or receive text or media messages, schedule a voice or video call, manage a commissary account, or post media to a secure social network. In one or more embodiments of the invention, voice and video calls made using the inmate computing device (212) are monitored by one or more administrators using the administrator computing device (206), and are recorded and stored in a data storage system within the controlled facility (200), within the outside facility (not shown), or within a third party provider (not shown).

In one or more embodiments of the invention, the identity of the visitor or outsider targeted by the inmate or attempting to contact the inmate using the inmate computing device (212) is verified against inmate target restrictions imposed on the inmate. Such restrictions may be associated with the inmate's identity data item and may be stored locally within the controlled facility (200), within the outside facility (not shown), or within a third party provider (not shown). The visitor or outsider identity may be verified by the local server (214) or by another server within the outside facility (not shown), or within a third party provider (not shown).

In one or more embodiments of the invention, the inmate computing system (212) and/or the inmate application (220) may limit access to the communications network (216) based on one or more restrictions (inmate use restrictions, inmate target restrictions, and device use restrictions). Further, the inmate computing system (212) and/or the inmate application (220) may gather data from input devices of the inmate computing system (212) to determine whether one or more restrictions apply. Such input devices may include, for example, a system clock, a global positioning system antenna, a wide area network antenna, etc.

In one or more embodiments of the invention, the local server (214) is a computer system or group of computers systems located within the controlled facility (200) that facility communication between inmates and visitors, outsiders, and/or other inmates. Specifically, the local server (214) may implement the software necessary to host voice and video calls between and among the visitor kiosk (202), the inmate kiosk (208), the inmate phone (210), and an outsider computing system (not shown). The local server (214) may also include functionality to enforce communication restrictions associated with the inmates using the inmate kiosk (208) or inmate phone (210). Alternatively, the local server (214) may merely provide access to other systems capable of hosting the communication software and data storage (e.g., located within an offsite facility or a third party provider). Further, In one or more embodiments of the invention, the local server (214) includes functionality to regulate inmate access to a secure social network.

Figure 3:
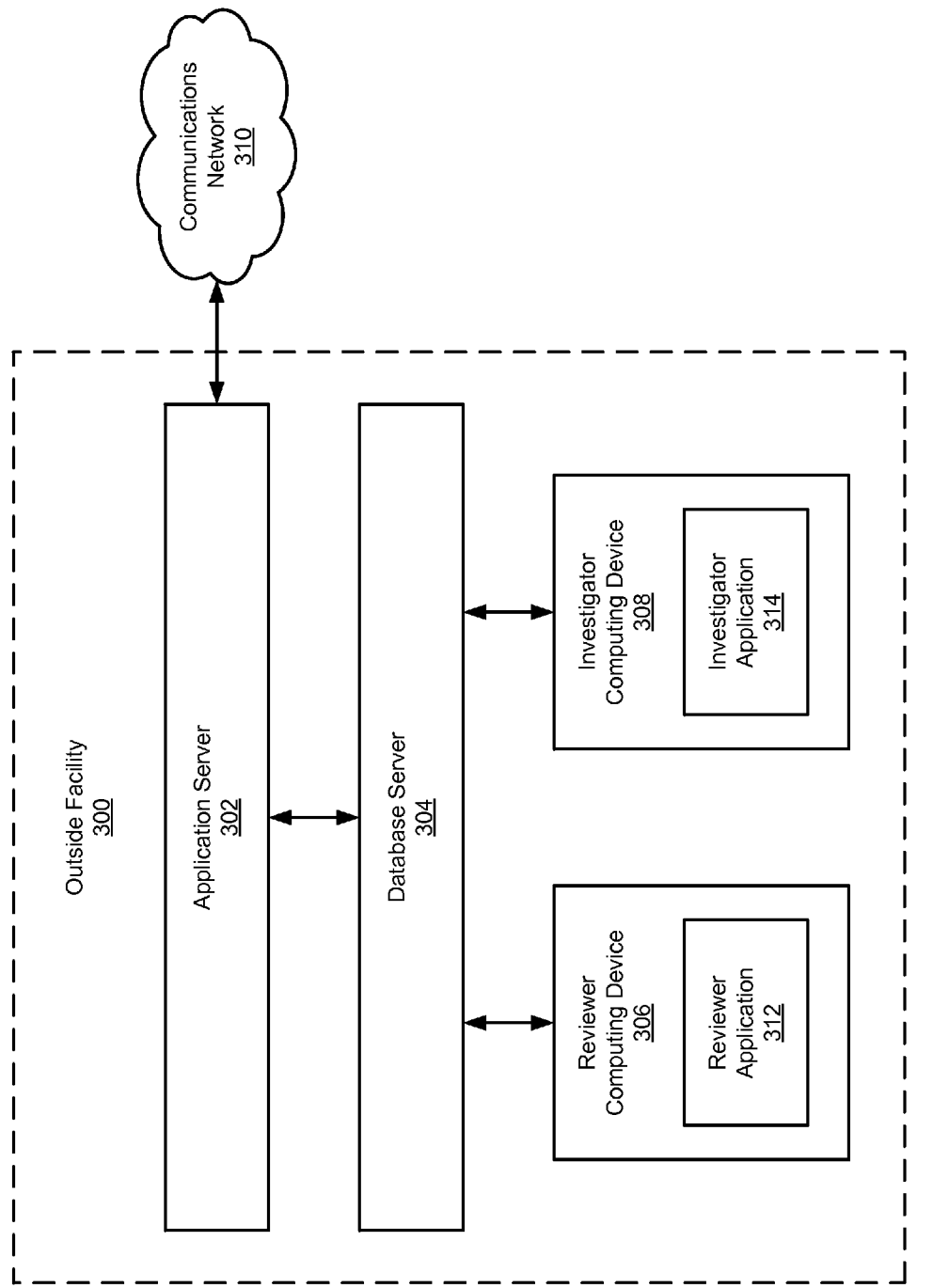
FIG. 3 shows a diagram of an outside facility in accordance with one or more embodiments of the invention.

FIG. 3 shows an outside facility in accordance with one or more embodiments of the invention. As shown in FIG. 3, the outside facility (300) may include an application server (302), a database server (304), a reviewer computing system (306), and an investigator computing system (308). The application server (302) is communicatively coupled to the communications network (310). The reviewer computing device (306) may include a reviewer application (312), and the investigator computing device (308) may include an investigator application (314).

In one or more embodiments of the invention, the application server (302) is a computing system or group of computing systems configured to authenticate inmates, visitors, outsiders, administrators, reviewers, and/or investigators. Specifically, the application server (302) includes functionality to receive a request to authenticate an inmate, visitor, outsider, administrator, reviewer, and/or an investigator, retrieve verified data associated with the request, and compare the verified data to verification data submitted in the authentication request. In one or more embodiments of the invention, the application server provides access to identity data items and other data stored in the database server (304).

In one or more embodiments of the invention, the database server (304) is a computing system or group of computing system configured to store data about inmates, visitors, outsiders, administrators, reviewers, and/or investigators as well as communication data describing communications between and among inmates, visitors, outsiders, administrators, reviewers, and/or investigators. Data stored in the database server may include, but is not limited to, identity data items, verified data, approved communication media, communication media pending review In one or more embodiments of the invention, the reviewer computing device (306) is a computing system configured to execute the reviewer application (312). In one or more embodiments of the invention, a reviewer is a person charged with viewing a media item submitted by an inmate, visitor, outsider or administrator, and determining one or more attributes of the media item. Based on the determined attributes of the media item, the reviewer may then approve the media item for transmission to its target inmate, visitor, or outsider. Alternatively, the reviewer may reject the media item, conditionally approve the media item, or redact parts of the media item, thus preventing complete transmission to its target inmate, visitor, or outsider. In one or more embodiments of the invention, the reviewer application (312) include functionality to view media items, associate one or more attributes to the media item, and/or mark the media items as approved or rejected.

In one or more embodiments of the invention, the investigator computing device (308) is a computing system configured to execute the investigator application (314). In one or more embodiments of the invention, an investigator is a person gathering information about an inmate, visitor, or outsider generally for the purposes of law enforcement. The investigator application (314) includes functionality to provide access to data stored on the database server (304) for investigative purposes.

Figure 4:
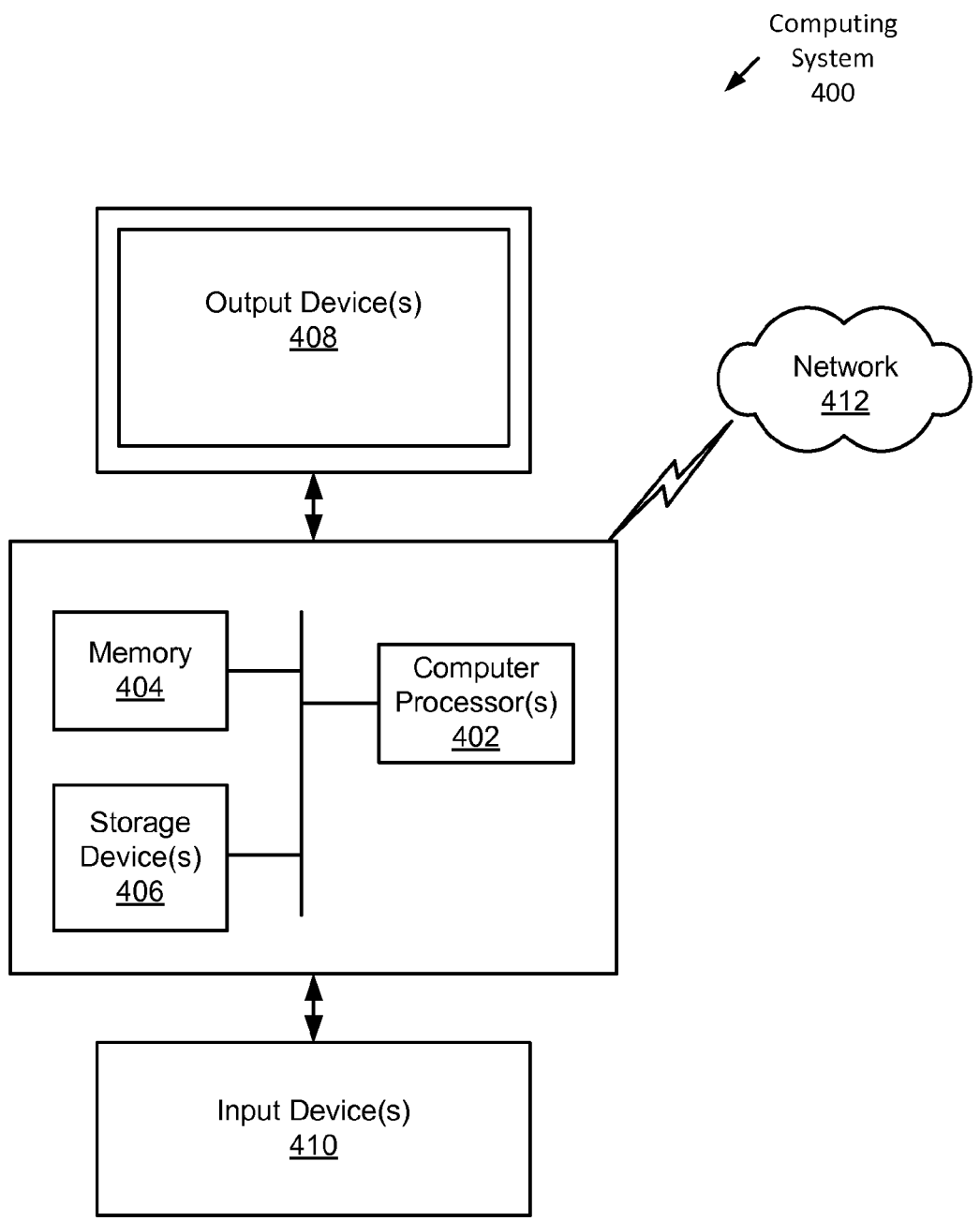
FIG. 4 shows a diagram of a computing system in accordance with one or more embodiments of the invention.

FIG. 4 shows a general computing system in accordance with one or more embodiments of the invention. As shown in FIG. 4, the computing system (400) may include one or more computer processor(s) (402), associated memory (404) (e.g., random access memory (RAM), cache memory, flash memory, etc.), one or more storage device(s) (406) (e.g., a hard disk, an optical drive such as a compact disk (CD) drive or digital versatile disk (DVD) drive, a flash memory stick, etc.), and numerous other elements and functionalities. The computer processor(s) (402) may be an integrated circuit for processing instructions. For example, the computer processor(s) may be one or more cores, or micro-cores of a processor. The computing system (400) may also include one or more input device(s) (410), such as a touchscreen, keyboard, mouse, microphone, touchpad, electronic pen, camera, or any other type of input device. Further, the computing system (400) may include one or more output device(s) (408), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (400) may be connected to a network (414) (e.g., a local area network (LAN), a wide area network (WAN) such as the Internet, mobile network, or any other type of network) via a network interface connection (not shown). The input and output device(s) may be locally or remotely (e.g., via the network (412)) connected to the computer processor(s) (402), memory (404), and storage device(s) (406). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

Further, one or more elements of the aforementioned computing system (400) may be located at a remote location and connected to the other elements over a network (414). Further, embodiments of the invention may be implemented on a distributed system having a plurality of nodes, where each portion of the invention may be located on a different node within the distributed system. In one or more embodiments of the invention, the node corresponds to a distinct computing device. Alternatively, the node may correspond to a computer processor with associated physical memory. The node may alternatively correspond to a computer processor or micro-core of a computer processor with shared memory and/or resources.

Figure 5A:
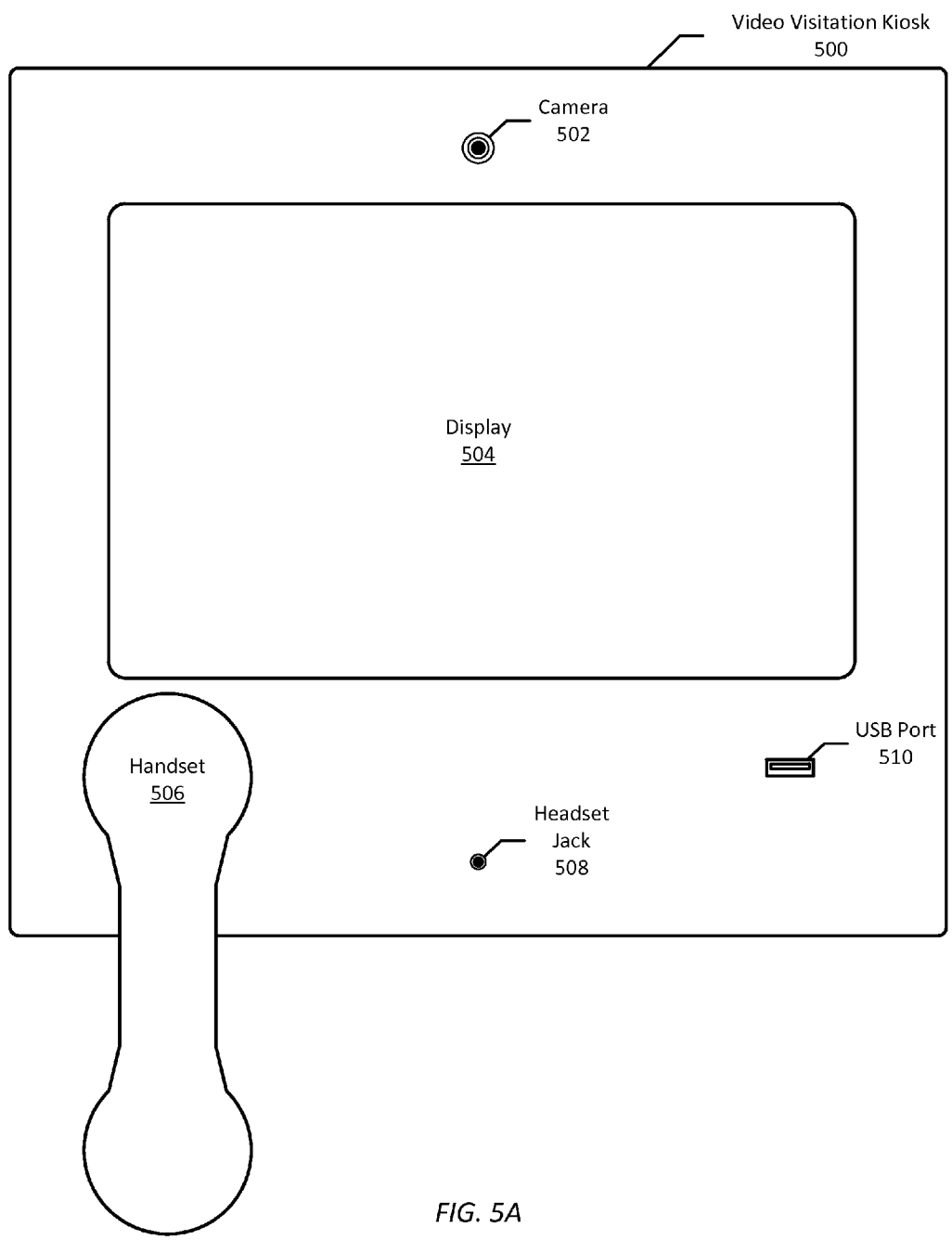
FIGS. 5A-5B show diagrams of a video visitation terminal in accordance with one or more embodiments of the invention.

FIG. 5A shows a video visitation kiosk in accordance with one or more embodiments of the invention. Specifically, the video visitation kiosk (500) is a type of computing device as described in FIG. 4. As shown in FIG. 5A, the video visitation kiosk (500) includes a camera (502), a display (504), a handset (506), a headset jack (508), and a universal serial bus (USB) port (510).

Figure 5B:
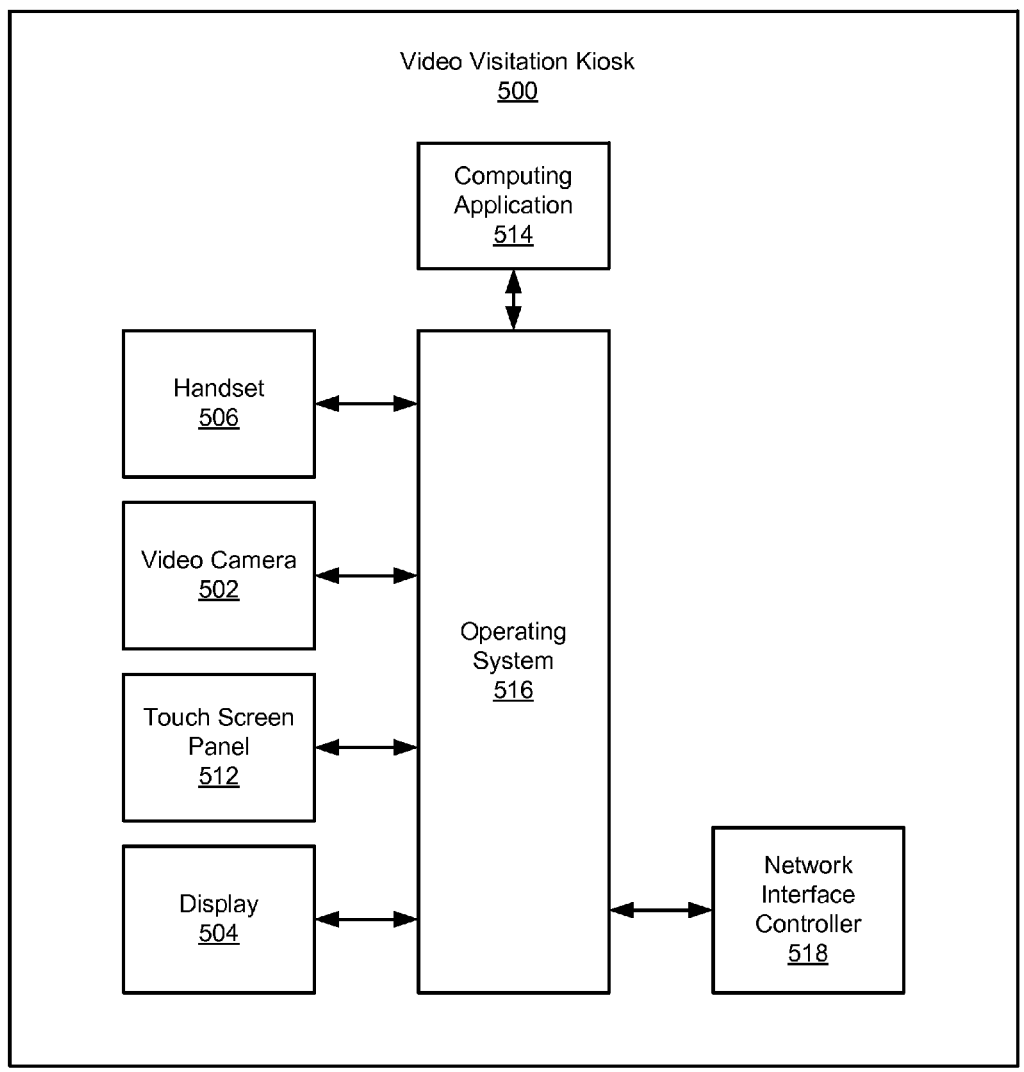

FIG. 5B shows the hardware and software elements of a video visitation kiosk in accordance with one or more embodiments of the invention. The hardware and software elements shown in FIG. 5B may be in addition to the elements described in FIG. 4. As shown in FIG. 5B, the video visitation kiosk (500) includes a handset (506), a video camera (502), a touch screen panel (512), a display (504), a computing application (514), an operating system (516), and a network interface controller (518).

Figure 6:
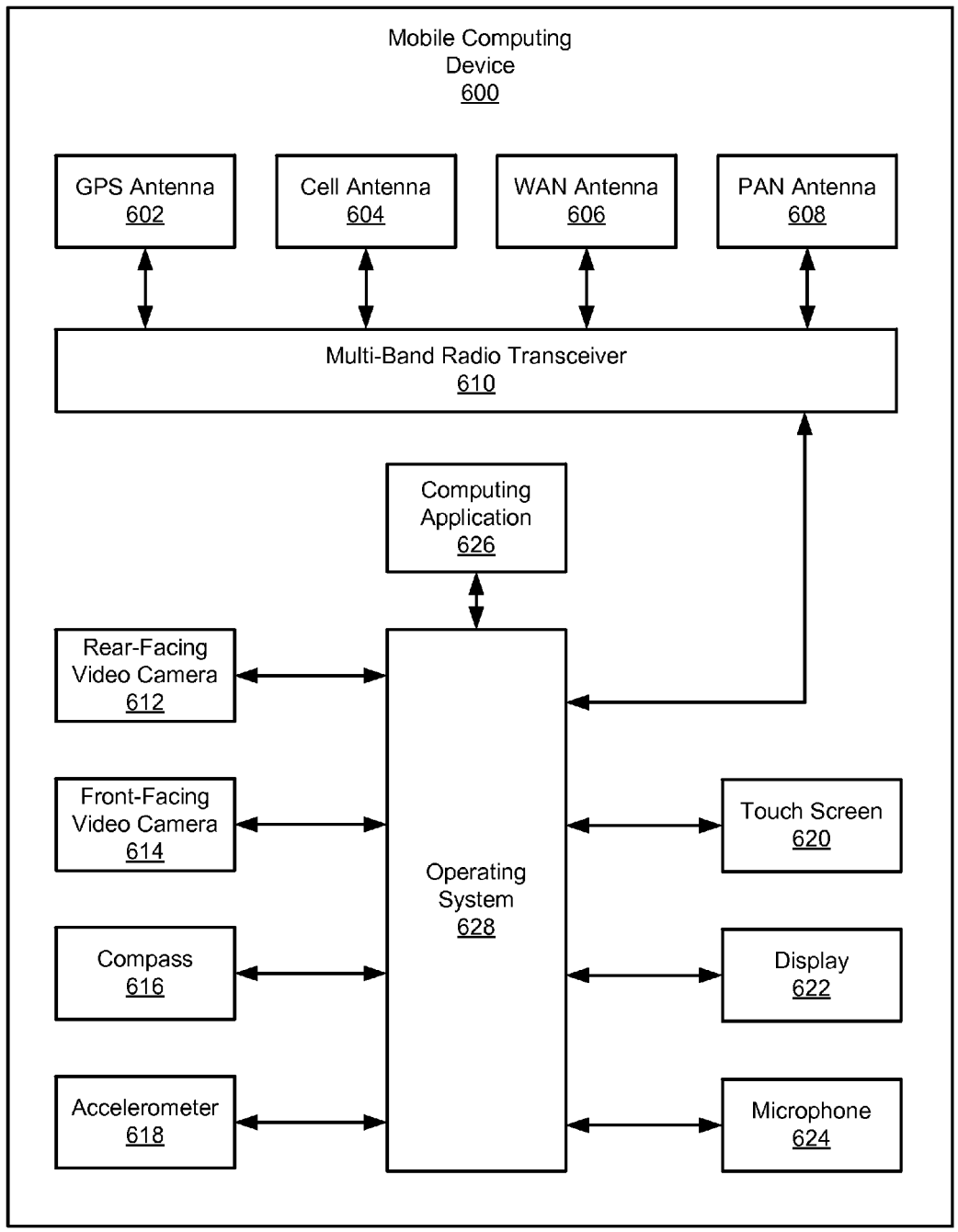
FIG. 6 shows a diagram of a mobile computing device in accordance with one or more embodiments of the invention.

FIG. 6 shows the hardware and software elements of a mobile computing device in accordance with one or more embodiments of the invention. Specifically, the mobile computing device (600) is a type of computing device as described in FIG. 4. The hardware and software elements shown in FIG. 6 may be in addition to the elements described in FIG. 4.

As shown in FIG. 6, the mobile computing device (600) may include a global positioning system (GPS) antenna (602), a cell antenna (604), a wide area network (WAN) antenna (606), and a personal area network (PAN) antenna (608), each connected to a multi-band radio transceiver (610). The mobile computing device (600) also may include a rear-facing video camera (612), a front-facing video camera (614), a compass (616), an accelerometer (618), a touch screen (620), a display (622), and a microphone (624). The mobile computing device (600) also may include a computing application (626) executing on an operating system (628).

Figure 7:
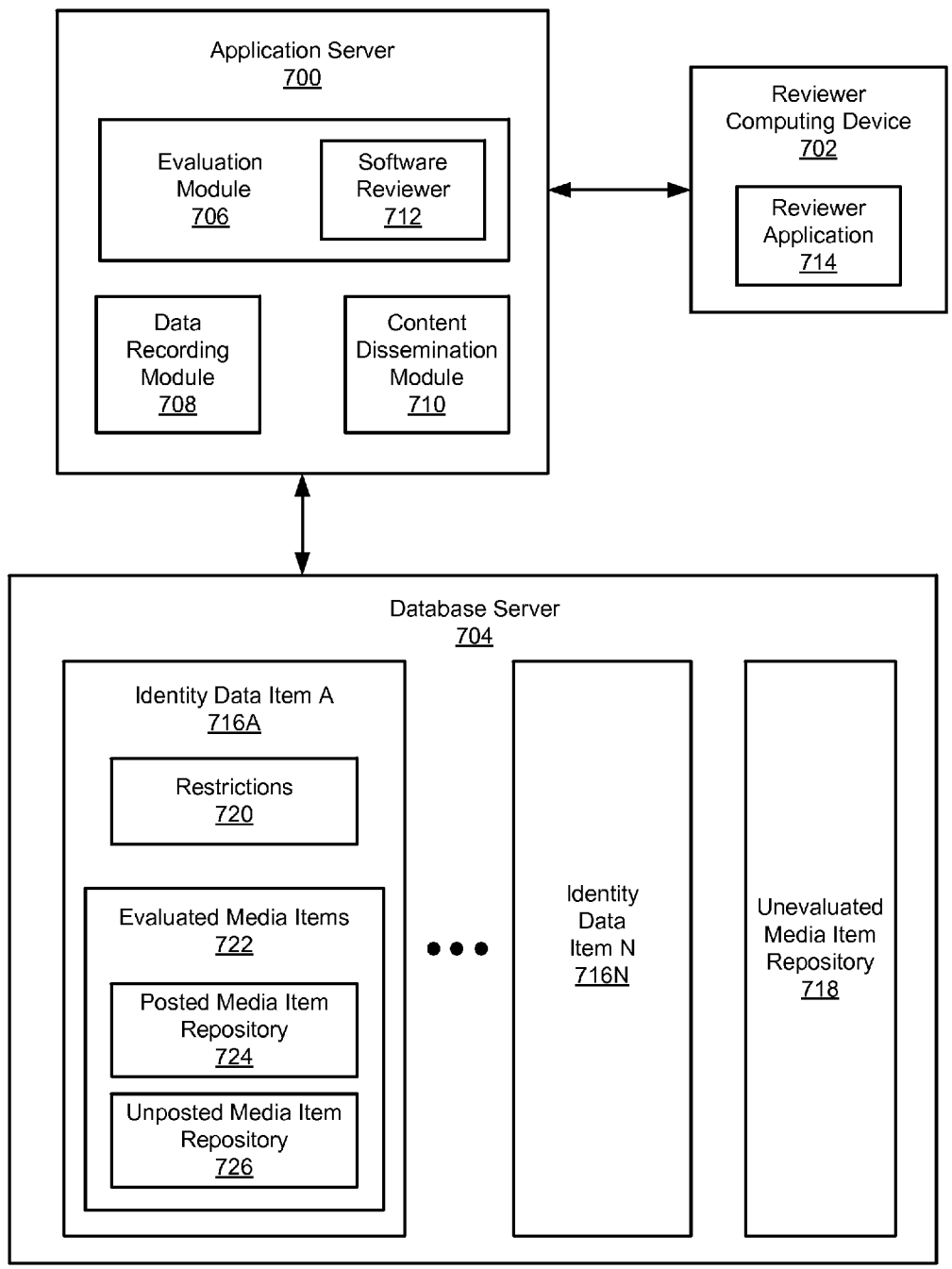
FIG. 7 shows a diagram of a database server in accordance with one or more embodiments of the invention.

FIG. 7 shows a system in accordance with one or more embodiments of the invention. The database server shown in FIG. 7 shows addition elements to those shown in FIG. 3. As shown in FIG. 7, the application server (700) is communicatively coupled to a database server (704) and a reviewer computing device (702). The application server (700) may include an evaluation module (706), a data recording module (708), and a content dissemination module (710). The evaluation module (706) may include a software reviewer (712). The reviewer computing device (702) may include a reviewer application (714). The database server (704) may include multiple identity data items (identity data item A (716A), identity data item N (716N)) and an unevaluated media item repository (718). Each identity data item (identity data item A (716A), identity data item N (716N)) may include restrictions (720) and evaluated media items (722). The evaluated media items (722) may include a posted media item repository (724) and an unposted media item repository (726).

In one or more embodiments of the invention, the content dissemination module (710) is a process or group of processes with functionality to provide access to media items (e.g., digital text, digital photos, digital videos, digital audio, etc.). Specifically, the content dissemination module (710) may include functionality to receive requests to submit or access a media item, determine whether the source of the request is allowed to submit or access the media item, and grant or deny the submission or access to the media item.

In one or more embodiment of the invention, the content dissemination module (710) is a component of a secure social network (SSN). In one or more embodiments of the invention, a SSN includes a network of media items submitted by SSN members. Access to the SSN may require authentication of the user (e.g., inmate, visitor, or outsider) in a manner described above. Each media item submitted by SSN members may be associated with the SSN member who submitted that media item. In one or more embodiments of the invention, each SSN member is associated with a "page" (e.g., location, webpage, network storage address, etc.) on the SSN. A SSN member page may be a collection of media items submitted by that SSN member. The SSN member page may also include media items of other SSN member who targeted that SSN member page.

In one or more embodiments of the invention, each SSN member is or becomes associated with one or more contacts (i.e., friends, followers, etc.). In one or more embodiments of the invention, a SSN member's contacts are other SSN members that have indicated a desire to be connected to that SSN member within the SSN. Media items submitted by a SSN member may be accessible primarily or exclusively by the SSN member's contacts.

In one or more embodiments of the invention, the SSN includes SSN members that are inmates of a controlled facility and SSN members that are outsiders and/or visitors. Accordingly, in one or more embodiments of the invention, an SSN member's contacts may be subject to the approval of an administrator. Specifically, an SSN member who is an inmate or would like to be connected to an inmate through the SSN may send a request to connect to the SSN that is evaluated by an administrator. That administrator may allow or deny the request depending upon any restrictions applicable to the inmate.

In one or more embodiments of the invention, the content dissemination module (710) may determine a SSN member's ability to submit (i.e., post) or access (i.e., view, watch, read, listen to, etc.) media items in the SSN. Specifically, a SSN member's ability to post or access media items in the SSN may be dependent upon restrictions applicable to that SSN member. In the event that an inmate SSN member attempts to post a media item on the SSN that is adverse to that inmate's restrictions, then the post may be rejected. Similarly, in the event that an inmate SSN member attempts to access a media item on the SSN that is adverse to that inmate's restrictions, then access may be denied. Such restrictions may be applicable to requests to post a media item to the inmate's own SSN member page or to another SSN member page. The restrictions may also be applicable to requests to access media items on another SSN member page. Further, the restrictions may be applicable to requests made by other SSN members to post media items on the inmate's SSN member page. Other restrictions may apply to the SSN member, such as limitations on accessing a particular page, limitations on viewing a full resolution version of an image, limitations on the ability to save a media item, limitations on the ability to access a media item a second time, etc.

In one or more embodiments of the invention, media items are obtained or created in a variety of ways. For example, media items may be text, audio, image, or video captured or composed on an inmate computing device, inmate kiosk, visitor kiosk, or outsider computing device. The media items may be imported from a third party provider, such as a photo hosting service or social network. The media items may be uploaded from a local data storage device, such as a flash drive, to an inmate computing device, inmate kiosk, visitor kiosk, or outsider computing device. In one or more embodiments of the invention, the inmate application, inmate kiosk, visitor kiosk, or outsider application includes software with functionality to generate a request to post or access a media item. Such requests may include an indication of the target SSN member page where the media item exists that the user (e.g., inmate, visitor, or outsider) wants to post or access.

In one or more embodiments of the invention, the identity data items (identity data item A (716A), identity data item N (716N)) are data structures with functionality to store information about users of the system (e.g., inmates, visitors, and outsiders). In one or more embodiments of the invention, each user (e.g., inmates, visitors, and outsiders) is associated with an identity data item (identity data item A (716A), identity data item N (716N)). In one or more embodiments of the invention, the identity data items (identity data item A (716A), identity data item N (716N)) include elements not shown in FIG. 7 (e.g., authentication data, unique identifiers, etc.).

In one or more embodiments of the invention, each repository (unevaluated media item repository (718), posted media item repository (724), unposted media item repository (726)) is a data structure with functionality to store media items (e.g., digital photo files, digital video files, digital text files) or reviewed data items. The repositories (unevaluated media item repository (718), posted media item repository (724), unposted media item repository (726)) may be implemented as separate data structures, as shown in FIG. 7. Alternatively, the repositories (unevaluated media item repository (718), posted media item repository (724), unposted media item repository (726)) may be implemented as a single data structure that distinguishes the status of media items (e.g., using tags, metadata, etc.).

In one or more embodiments of the invention, media items received from a SSN member (e.g., an inmate, outsider, or visitor) are placed (i.e., digitally stored in, copied to, etc.) in the unevaluated media item repository (718). In one or more embodiments of the invention, media items placed in the unevaluated media item repository (718) or the unposted media item repository (726) are inaccessible by SSN members (but may be accessible by administrators, reviewers, investigators, etc.). In one or more embodiments of the invention, unevaluated media items in the unevaluated media item repository (718) are subjected to evaluation by the evaluation module (706).

In one or more embodiments of the invention, the evaluation module (706) is a process or group of processes with functionality to obtain an unevaluated media item from the unevaluated media item repository (718) and evaluate the media item to identify media attributes of the media item. In one or more embodiments of the invention, the evaluation module (706) evaluates unevaluated media items independent of information about the source or target SSN member, or any SSN member's restrictions (e.g., restrictions (720)). Specifically, the result of the evaluation process undertaken by the evaluation module (706) (and/or the reviewer application (714)) is a set of media attributes that describe the media item being evaluated.

In one or more embodiments of the invention, media attributes are classifications used to identify different characteristics of the media item. Media attributes may describe the content of the media item (e.g., words used in text document, objects depicted in a digital photo or digital video, language spoken in an audio file, etc.) or the media item itself (e.g., a unique identifier of the SSN who posted the media item, the file type, size, file metadata, geographic data, time of creation, time of submission, etc.). Media attributes may be general (e.g., boy, girl, day, loud, friendly wording, etc.) or specific (e.g., the name of an individual depicted or heard in the media item, the location where the media item was created, etc.). Examples of media attributes include, but are not limited to, men, heads, portraiture, busts, policemen, firemen, women, portraiture, busts of women, nude women, women wearing underclothes, bathing suits or brief attire, children, girl(s), boy(s), baby or babies, groups of humans, groups of males, groups of females, males and females, adults and children, including family groups, groups of children, humans depicted engaging in activities, parts of the human body, skeletons, skulls, headwear, writing, drawing or painting materials, small office materials, paper goods, documents, books, magazines, newspapers, weapons, firearms, ammunition, and explosives.

In one or more embodiments of the invention, the evaluation module (706) includes a software reviewer (712) that processes the media item to obtain attributes. In one or more embodiments of the invention, the software reviewer (712) processes the media item to identify attributes of the media item including recognized individuals, nudity, background scenery, objects, metadata (e.g., time the media item was created or modified, location information about the media item, etc.). The software reviewer (712) may use facial recognition software, voice recognition software, text recognition software, or other tools to identify the general or specific media attributes of a media item. Once the software reviewer (712) identifies one or more media attributes of the media item, the media attributes are assigned to the media item. In one or more embodiments of the invention, the media attributes are saved in a reviewed data item for the media item. Further information about the reviewed data item is provided in FIG. 8.

In one or more embodiments of the invention, the evaluation module (706) works in conjunction with a reviewer application (714). In one or more embodiments of the invention, the reviewer application (714) is operated by a human reviewer. Specifically, a human reviewer operating the reviewer application (714) views or listens to the media item and assigns one or more media attributes to the media item. In one or more embodiments of the invention, the reviewer operating the reviewer application (714) is an employee of the service provider providing the SSN service.

In one or more embodiments of the invention, the evaluation process uses a combination of software reviewer (712) and human reviewer operating the reviewer application (714). Specifically, a media item may first be processed by a software reviewer (712) and then sent to the human reviewer based on the obtained attributes. For example, a software reviewer (712) may have a 45% false positive rate when detecting nudity and therefore any media item that a software reviewer detects as including nudity attributes may be sent to a human reviewer for a second review. In one or more embodiments of the invention, identifying the attributes of a media item may be divided between the software reviewer (712) and the human reviewer. For example, a software reviewer (712) may process a media item using facial recognition software in order to determine the presence of known criminals (a task that may be difficult or impossible for a human reviewer), and a human reviewer may be charged with determining whether a media item includes any gang references (a task that may be difficult or impossible for a software reviewer). Further detail regarding the evaluation process is described in FIG. 9.

In one or more embodiments of the invention, the restrictions (720) are digitally stored limitations applicable to the user (e.g., inmates, visitors, and outsiders) associated with the identity data item (identity data item A (716A), identity data item N (716N)). The restrictions (720) may include physical restrictions and/or communication restrictions as described above. Specifically, restrictions (720) may have limitations based on, for example, the identity of the SSN member targeted by a request to post a media item, the identity of the viewer of a posted media item, a crime the inmate has been convicted or accused of, the rules within a controlled facility housing the inmate, rules within a the section of the controlled facility housing the inmate, the time of day, day of week, country or state in which the sender or receiver resides, the age of the sender or receiver, the gender of the sender or receiver, etc.

In one or more embodiments of the invention, the restrictions (720) include limitations in terms of media attributes.

Specifically, the restrictions (720) may include a list of restricted attributes describing media items that SSN member is not allowed to view or post. Such restricted attributes may be in terms of the content of the media item (e.g., a specific word that an inmate is not allowed to use in text messages, a person that the inmate is not allowed to have digital photos of, an activity that the inmate is not allowed to have digital photos of, etc.). Attributes may also be in terms of data about the media item (e.g., digital photos that exceed a certain size, audio files that are incompatible with the reviewer application, etc.). Attributes may also be in terms of the identity of the sender or recipient (e.g., a white list containing SSN members the inmate is allowed to communicate with, etc.). Restricted attributes may be negative attributes (e.g., attributes that render a media item unposted or unviewable by the SSN member) or positive attributes (e.g., attributes that a media item must include for that media item to be posted or viewable by the SSN member).

In one or more embodiments of the invention, the data recording module (708) is a process or group of processes with functionality to record information about the activities of SSN members. Specifically, the data recording module (708) may create a record of attempts to post or access media items in the SSN. The record may be stored in an identity data item (e.g., identity data item A (716A), identity data item N (716N)) associated with the SSN member. The record may be provided to investigators or administrators associated with a controlled facility. The record may be used for the purposes of law enforcement or enforcement of the rules of a controlled facility. The record may also be used to evaluate the usefulness and efficiency of the SSN.

In one or more embodiments of the invention, media items posted by an inmate and placed in the inmate's posted media item repository (724) are viewable by other SSN members connected to the inmate. In the event that the media item is later determined to be improperly placed in the posted media item repository (724), the media item is transferred to the unposted media item repository (726) and the SSN members connected to the inmate will no longer have the ability to view the media item.

Figure 8:
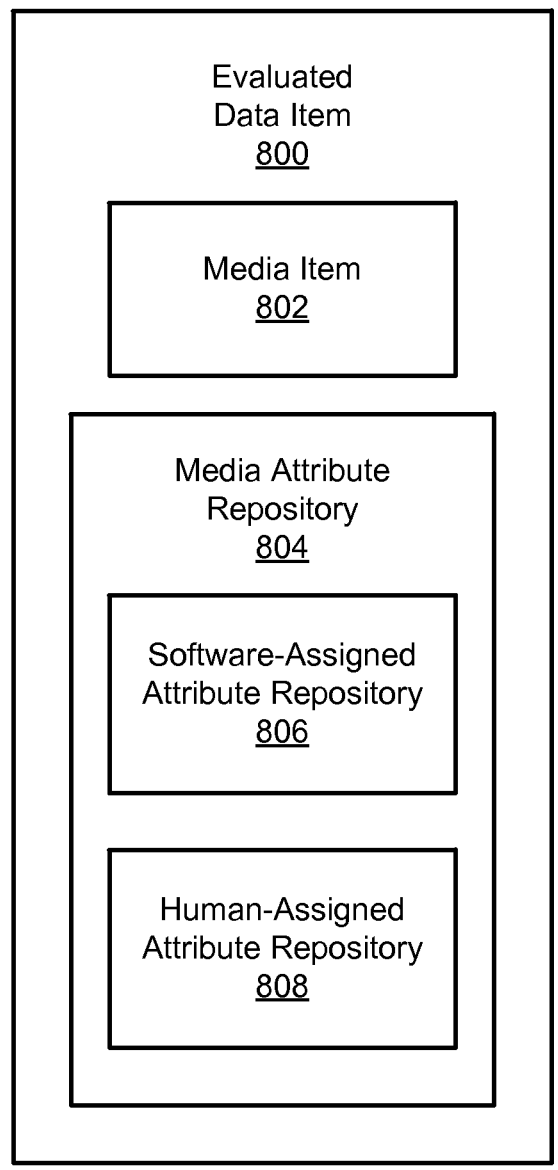
FIG. 8 shows a diagram of a evaluated data item in accordance with one or more embodiments of the invention.

FIG. 8 shows an evaluated data item in accordance with one or more embodiments of the invention. As shown in FIG. 8, the evaluated data item (800) includes a media item (802) and a media attribute repository (804). The media attribute repository (804) includes a software-assigned attribute repository (806) and a human-assigned attribute repository (808).

In one or more embodiments of the invention, the evaluated data item (800) is a data structure created by an evaluation module in response to a request to post the media item (802) to a SSN. Once created, the evaluated data item (800) may be provided to a content dissemination module to determine whether the media item (802) is allowed to be posted. In one or more embodiments of the invention, the evaluation data item (800) is associated with a SSN member who generated the request to post the media item, and a SSN member page that the sender of the request has targeted. In one or more embodiments of the invention, a SSN member may target his or her own SSN member page, or the member page of another SSN member.

In one or more embodiments of the invention, the software-assigned attribute repository (806) is a repository containing media attributes identified by a software reviewer as described in FIG. 7. In one or more embodiments of the invention, the human-assigned attribute repository (808) is a repository containing media attributes identified by a human reviewer as described in FIG. 7

Figure 9:
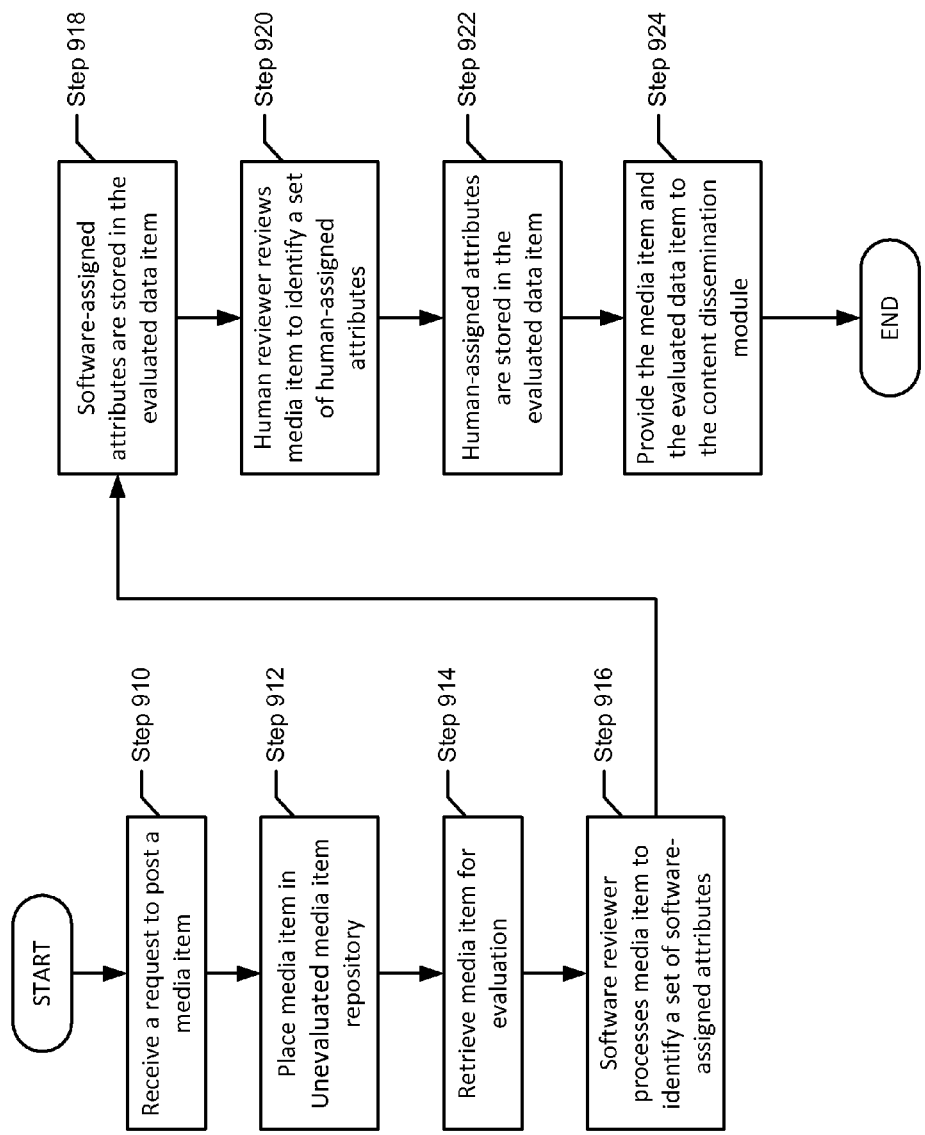
FIG. 9 shows a flow diagram in accordance with one or more embodiments of the invention.

FIG. 9 shows a flowchart for reviewing a media item in accordance with one or more embodiments of the invention. While the various steps in these flowcharts are presented and described sequentially, one of ordinary skill will appreciate that some or all of the steps may be executed in different orders, may be combined or omitted, and some or all of the steps may be executed in parallel.

In Step 910, the application server receives a request to post a media item. In one or more embodiments of the invention, the request includes an identifier of the SSN member (i.e., source) that generated the request. In one or more embodiments of the invention, the request includes an identifier of the SSN member (i.e., target) associated with the SSN member page targeted by the request. In one or more embodiments of the invention, the source and target of a request is the same SSN member. In one or more embodiments of the invention, the source and target of a request are different SSN members. In one or more embodiments of the invention, one or both of the source and target is an SSN member who is an inmate. In one or more embodiments of the invention, one or both of the source and target is an SSN member who is an outsider or visitor.

In Step 912, the media item is placed in an unevaluated media item repository. In Step 914, the media item is retrieved from the unevaluated media item repository by the evaluation module for evaluation. In one or more embodiments of the invention, the evaluation module generates an evaluated data item for the media item and stores the media item in the evaluated data item. In Step 916, a software reviewer processes the media item to identity one or more media attributes (i.e., software-assigned attributes). In Step 918, the software-assigned attributes are stored in the evaluated data item.

In Step 920, a human reviewer reviews the media item to identity one or more media attributes (i.e., human-assigned attributes). In one or more embodiments of the invention, the human reviewer operates a reviewer application that is communicatively coupled to the evaluation module. In one or more embodiments of the invention, the human reviewer may verify and/or adjust the software-assigned attributes. In one or more embodiments of the invention, the human reviewer is presented with a set of tags or labels to assign to the media item based on the human reviewers viewing, hearing, or reading of the media item. In Step 922, the human-assigned attributes are stored in the evaluated data item. In Step 924, the evaluated data item (including the media item and assigned attributes) is provided to the content dissemination module.

Figure 10:
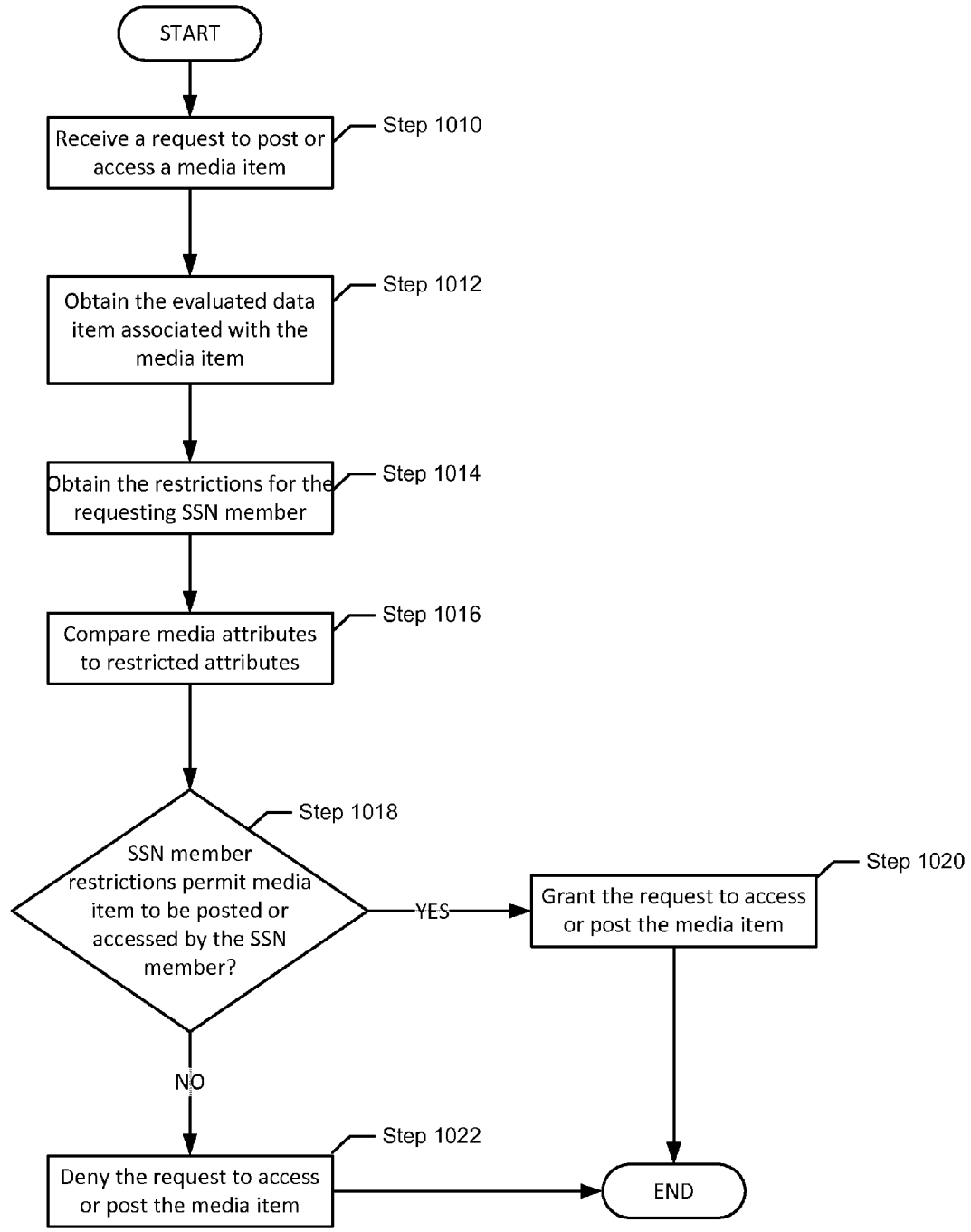
FIG. 10 shows a flow diagram in accordance with one or more embodiments of the invention.

FIG. 10 shows a flowchart for servicing a request to post or access a media item in accordance with one or more embodiments of the invention. While the various steps in these flowcharts are presented and described sequentially, one of ordinary skill will appreciate that some or all of the steps may be executed in different orders, may be combined or omitted, and some or all of the steps may be executed in parallel.

In Step 1010, the content dissemination module receives a request. The request may be to post a media item to a SSN member's page or to access a media item on a SSN member's page. In one or more embodiments of the invention, a request to access a media item may be received from an SSN member. In one or more embodiments of the invention, a request to post a media item may be received via an evaluation module. In Step 1012, the content dissemination module obtains the evaluated data item associated with requested media item. In one or more embodiments of the invention, the evaluated data item for a request to post is obtained from the evaluation module. In one or more embodiments of the invention, the evaluated data item for a request to access is obtain from the posted media item repository of a SSN member.

In Step 1014, the content dissemination module obtains the restrictions associated with the SSN member requesting to post or access the media item. In one or more embodiments of the invention, the content dissemination module also obtains the restrictions associated with the SSN member whose page is targeted by the request. In Step 1016, the content dissemination module compares the media attributes stored in the evaluated data item to the restricted attributes obtained for the one or more SSN members. In one or more embodiments of the invention, the content dissemination module compares the media attributes to the restricted attributes to determine whether one or more of the media attributes matches the restricted attributes. In one or more embodiments of the invention, a match need not be exact or could be triggered based on a genus-species relationship (e.g., a restricted attribute of "sports" may match a media attribute of "football"). In one or more embodiments of the invention, the content dissemination module determines that the restricted attributes exclude the media attributes by determining that none of the restricted attributes match the media attributes.

In Step 1018, the content dissemination module determines whether the SSN member restrictions permit the media item to be posted or accessed by the SSN member. If in Step 1018, the content dissemination module determines that the SSN member restrictions permit the media item to be posted or accessed by the SSN member, then in Step 1020, the content dissemination grants the request. In one or more embodiments of the invention, granting a request to post includes placing the evaluated data item (including the media item) in the posted media item repository of the requesting SSN. In one or more embodiments of the invention, media items in the posted media item repository of an SSN member are accessible by the SSN member and, potentially, one or more of the SSN member's contacts (depending on the restrictions of that SSN member contact). In one or more embodiments of the invention, granting a request to access includes making the media item accessible (i.e., viewable, playable, readable, etc.) to the requesting SSN member.

If in Step 1018, the content dissemination module determines that the SSN member restrictions do not permit the media item to be posted or accessed by the SSN member, then in Step 1022, the content dissemination denies the request. In one or more embodiments of the invention, denying a request to post includes placing the evaluated data item (including the media item) in the unposted media item repository of the requesting SSN. In one or more embodiments of the invention, media items in the unposted media item repository of an SSN member are inaccessible by the SSN member or the SSN member's contacts (but may be accessible by administrators and/or investigators). In one or more embodiments of the invention, denying a request to access includes keeping the media item inaccessible (i.e., unviewable, unplayable, unreadable, etc.) to the requesting SSN member. However, the media item may remain accessible to other SSN members depending on the SSN member's restrictions.

In one or more embodiments of the invention, an SSN member may navigate to another SSN member's page and (invisibly to the SSN member) generate separate access requests for each media item posted to the SSN member's page. Each request may be approved or denied based on the media attributes of each media item (including the identity of the SSN member who posted the media item).

Figure 11A:
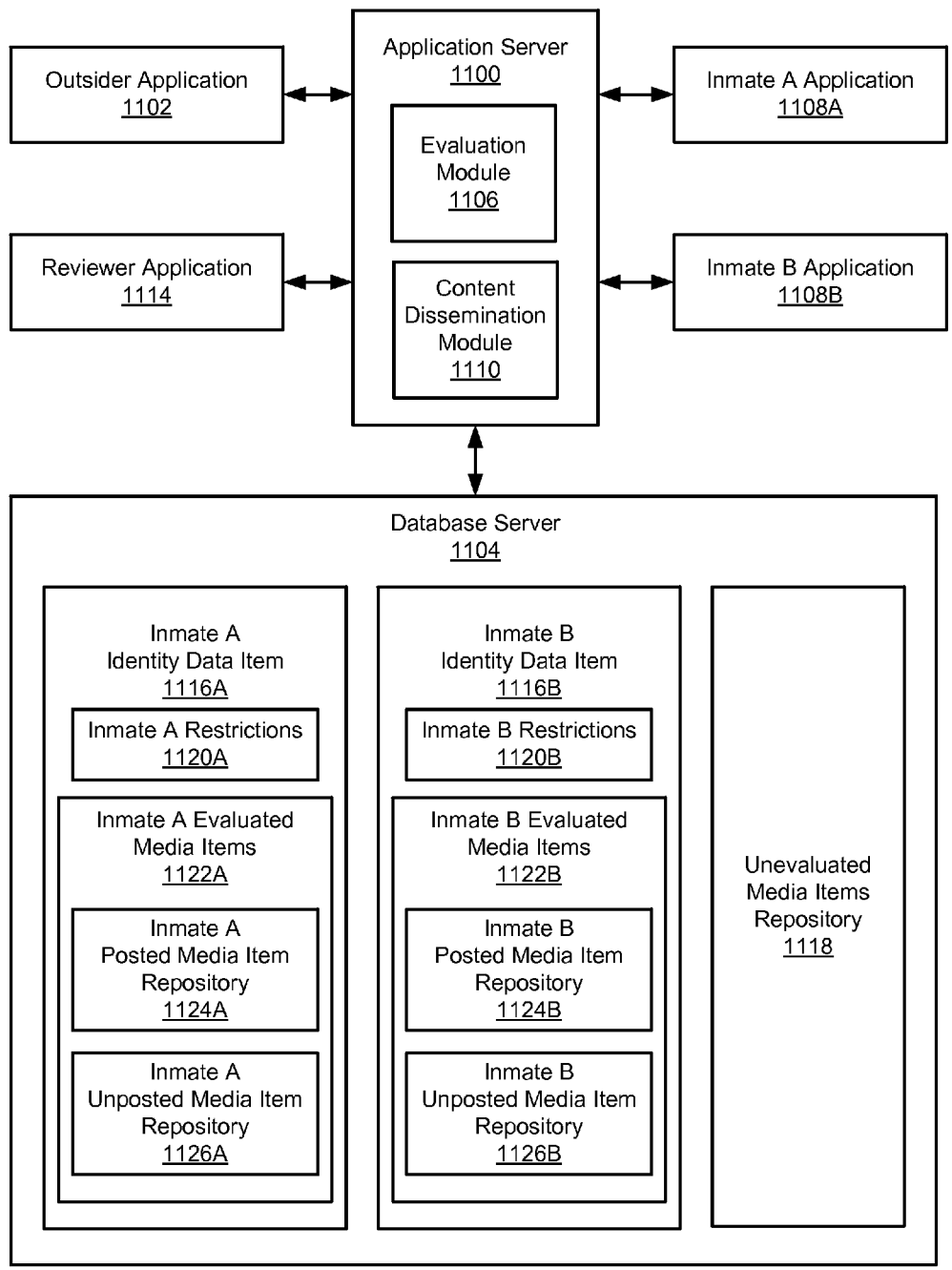
FIGS. 11A-11B show an example in accordance with one or more embodiments of the invention.
Figure 11B:
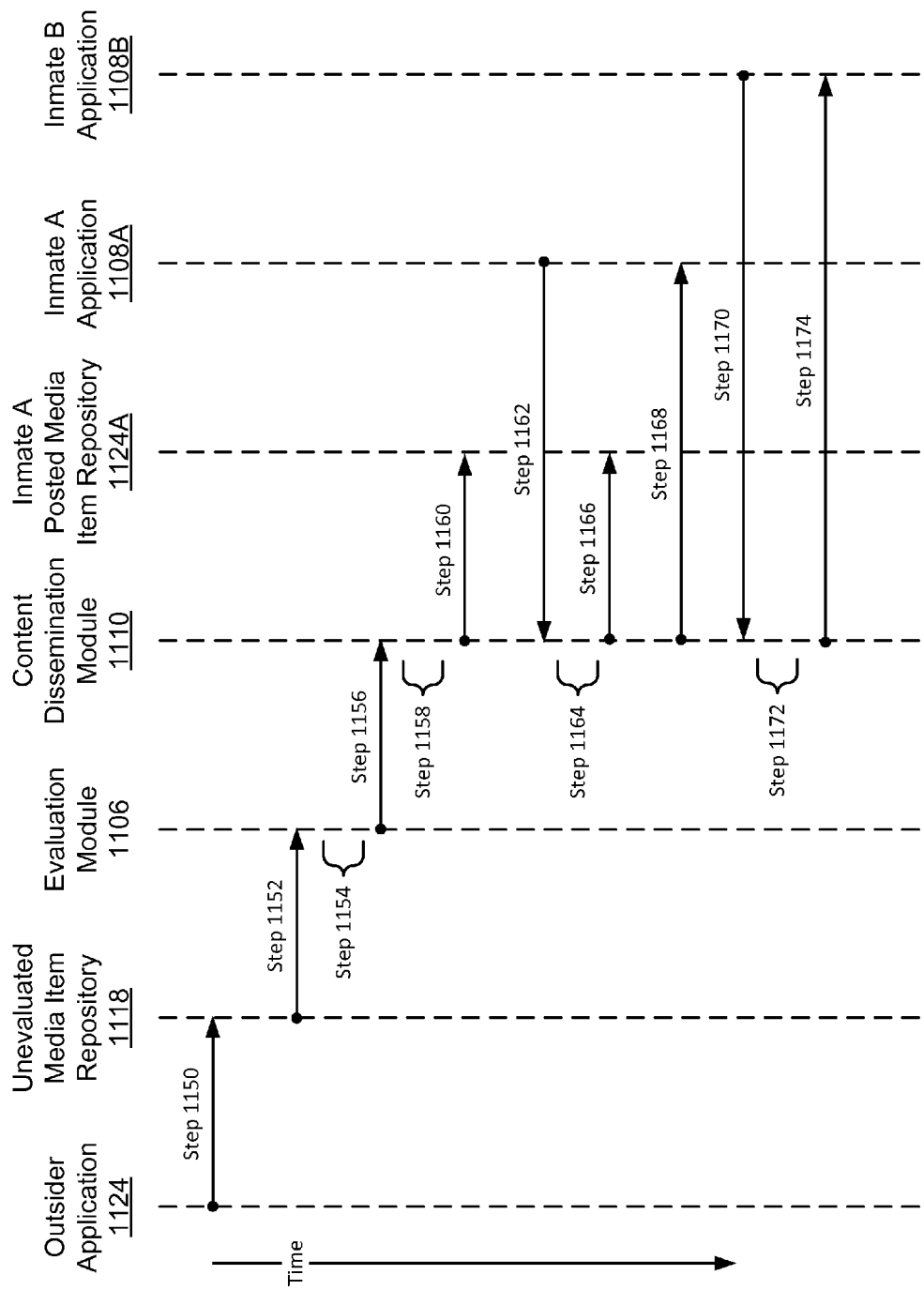

FIGS. 11A and 11B show an example in accordance with one or more embodiments of the invention. Specifically, FIG. 11A shows an example system in accordance with one or more embodiments of the invention. As shown in FIG. 11A, the example includes an application server (1100) communicatively coupled to an outsider application (1102), a reviewer application (1114), two inmate applications (inmate A application (1108A), inmate B application (1108B)), and a database server (1104). The application server (1100) includes an evaluation module (1106) and a content dissemination module (1110). The database server (1104) includes multiple identity data items (inmate A identity data item (1116A), inmate B identity data item (1116B)) and an unevaluated media item repository (1118). Each identity data item (inmate A identity data item (1116A), inmate B identity data item (1116B)) includes restrictions (inmate A restrictions (1120A), inmate B restrictions (1120B)) and evaluated media items (inmate A evaluated media items (1122A), inmate B evaluated media items (1122B)). The evaluated media items (1122) includes a posted media item repository (inmate A posted media item repository (1124A), inmate B posted media item repository (1124B)) and a unposted media item repository (inmate A unposted media item repository (1126A), inmate B unposted media item repository (1126B)).

FIG. 11B shows an example timeline in accordance with one or more embodiments of the invention. Specifically, FIG. 11B shows an example interaction between the elements shown in FIG. 11A. For the purposes of the example, assume that the outsider application is operated by an outsider named Mary Smith. Assume that inmate A is an inmate named John Smith, who is married to Mary Smith, and is subject to the restrictions of a controlled facility. Assume also that inmate B is an inmate named Mike Jones, who also is subject to the restrictions of the controlled facility. Assume further that Mary Smith, John Smith, and Mike Jones are each members of the SSN and have been authenticated for the current session.

In Step 1150, Mary Smith, operating the outsider application (1124), sends a request to post a media item on John Smith's page. Assume that the media item is a digital photo of John and Mary Smith's children swimming in a pool with Mary Smith and Mary Smith's sister Susan Smith. The media item is received and placed in the unevaluated media item repository (1118). In Step 1152, the media item is obtained by the evaluation module (1106) for evaluation.

In Step 1154, the media item is reviewed by a software reviewer. The software reviewer processes the digital photo and identifies the following media attributes: water, blue, children, swim, boy, girl, nudity, and woman. The software reviewer also identifies Susan Smith, who is a wanted fugitive. The media attributes, including the media attribute Susan Smith, are stored in an evaluated data item with the digital photo. The software reviewer also includes a unique identifier for Mary Smith's SSN member account and a unique identifier for John Smith's SSN member account in the evaluated data item.

Also in Step 1154, the media item and the software-assigned attributes are reviewed by a human reviewer operated the reviewer application (1114). The human reviewer reviews the media item and identifies the following media attributes: pool, hotel, happy, and daytime. The human reviewer also notices that a man in the background of the digital photo is wearing a shirt with the logo of the Alphas, an area gang. The human reviewer adds the attributes gang and alphas. The human reviewer also removes the software-assigned attribute of nudity which was misidentified by the software reviewer. The human-reviewed attributes are added to the evaluated data item.

In Step 1156, the evaluated data item and request to post are sent to the content dissemination module (1110). In Step 1158, the content dissemination module (1110) obtains the restrictions for the source SSN member (Mary Smith) and the restrictions for the SSN member associated with the target SSN member page (John Smith). Assume that Mary Smith has no restrictions. Assume that John Smith has only a few restrictions, include the restricted attributes of nudity, violence, blood, and California. The content dissemination module (1110) compares the media attributes stored in the evaluated data item to John Smith's restricted attributes, and determines that John Smith's restricted attributes exclude the media attributes. In response, in Step 1160, the content dissemination module (1110) places the evaluated data item in inmate A posted media item repository (124A).

In Step 1162, John Smith, operating inmate A application (1108A), logs on to his SSN member account, and attempts to view his SSN member page. John Smith's SSN member page includes multiple media items, and a request to access each one is generated when John Smith tries to view his SSN member page. The media items posted to John Smith's SSN member page are not necessary always going to be accessible by John Smith. John Smith's restricted attributes may be altered at any time for a number of different reasons. For example, John Smith may be convicted of a crime while in prison or he may be transferred to a different controlled facility with different rules. However, for the purposes of the example, assume that John Smith's restricted attributes have remained the same.

Continuing with Step 1162, a request to access the digital photo posted by Mary Smith is generated and sent to the content dissemination module (1110). In Step 1164, the content dissemination module (1110) compares the media attributes stored in the evaluated data item to John Smith's restricted attributes, and determines that John Smith's restricted attributes exclude the media attributes. In Step 1166, the content dissemination module (1110) retrieves the digital photo from the inmate A posted media item repository (1124A). In Step 1168, the content dissemination module (1110) grants John Smith access to the digital photo, and John Smith is able to view the digital photo using inmate A application (1108A).

In Step 1170, Mike Jones, operating inmate B application (1108B) navigates to John Smith's SSN member page, which automatically generates a request to access the media item (i.e., the digital photo). In Step 1172, the content dissemination module (1110) obtains the restrictions for the SSN member requesting access (Mike Jones) and the restrictions for the media item. Assume that Mike Jones is an approved contact of both John Smith and Mary Smith. Assume further that Mike Jones has the following restricted attributes: nudity, children, boy, girl, violence, drugs, gun, cars, and France. The content dissemination module (1110) compares the media attributes stored in the evaluated data item for the digital photo to Mike Jones's restricted attributes, and determines that Mike Jones's restricted attributes include the media attributes. Specifically, the content dissemination module (1110) determines that one or more of the restricted attributes matches the media attributes of the digital photo. In response, in Step 1174, the content dissemination module (1110) notifies Mike Jones (via inmate B application (1108B)) that access to the media item is denied.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for reviewing a posting to a secure social network (SSN) comprising:
  receiving, at an application server comprising a computer processor and via a computer network comprising Internet, a media item from a SSN member;
  generating, by the computer processor in the application server, a posted media item based on the media item, wherein the posted media item is posted in the SSN;
  evaluating, by the computer processor in the application server, the media item to identify a media attribute;
  generating, by the computer processor in the application server, a first identity data item of the SSN member, wherein the first identity data item comprises a first set of restricted attributes corresponding to the SSN member, and the media attribute of the media item;
  receiving, at the application server and via the computer network, a request to access the posted media item from an inmate of a controlled facility;
  retrieving, by the computer processor in the application server, in response to the request, and from the first identity data item of the SSN member, the media attribute and the first set of restricted attributes;
  retrieving, by the computer processor in the application server, in response to the request, and from a second identity data item of the inmate, a second set of restricted attributes corresponding to the inmate;
  determining, by the computer processor in the application server, whether the inmate is allowed to access the posted media item based on comparing the media attribute to the first set of restricted attributes and the second set of restricted attributes;
    when the inmate is allowed, by the computer processor in the application server, to access the posted media item:
      granting the inmate access, by the computer processor in the application server and via the computer network comprising Internet, to the posted media item based on the determination; and
    when the inmate is not allowed to access the posted media item:
      denying, by the computer processor in the application server, the inmate access to the posted media item based on the determination.

2. The method of claim 1, further comprising:
  generating, prior to receiving the request, the second identity data item of the inmate based at least on the second set of restricted attributes corresponding to the inmate;
  creating, in response to the request, a record of the request to access the posted media item;
  storing the record in the second identity data item; and
  providing, based on the second identity data item, the record to at least one selected from a group consisting of an investigator and an administrator of the controlled facility.

3. The method of claim 1, wherein determining that the inmate is allowed to access the posted media item comprises:
determining that the first set of restricted attributes and the second set of restricted attributes exclude the media attribute.

4. The method of claim 1, wherein determining that the inmate is not allowed to access the posted media item comprises:
determining that the first set of restricted attributes and the second set of restricted attributes include the media attribute.

5. The method of claim 1, wherein evaluating the posted media item to identify the media attribute comprises:
processing the posted media item by a software reviewer to identify the media attribute.

6. The method of claim 1, wherein evaluating the posted media item to identify the media attribute comprises:
reviewing the posted media item by a human reviewer to identify the media attribute.

7. The method of claim 1, wherein the SSN member is at least one selected from a group consisting of an outsider and a visitor.

8. A non-transitory computer readable medium comprising instructions that, when executed by a processor, perform a method for reviewing a posting to a secure social network (SSN), the method comprising:
receiving, via a computer network comprising Internet, a media item from a SSN member;
generating a posted media item based on the media item, wherein the posted media item is posted in the SSN;
evaluating the media item to identify a media attribute;
generating a first identity data item of the SSN member, wherein the first identity data item comprises a first set of restricted attributes corresponding to the SSN member, and the media attribute of the media item;
receiving a request to access the posted media item from an inmate of a controlled facility;
retrieving, in response to the request and from the first identity data item of the SSN member, the media attribute and the first set of restricted attributes;
retrieving, in response to the request and from a second identity data item of the inmate, a second set of restricted attributes corresponding to the inmate;
determining whether the inmate is allowed to access the posted media item based on comparing the media attribute to the first set of restricted attributes and the second set of restricted attributes;
when the inmate is allowed to access the posted media item:
granting the inmate access, via the computer network comprising Internet, to the posted media item based on the determination; and
when the inmate is not allowed to access the posted media item:
denying the inmate access to the posted media item based on the determination.

9. The non-transitory computer readable medium of claim 8, the method further comprising:
generating, prior to receiving the request, the second identity data item of the inmate based at least on the second set of restricted attributes corresponding to the inmate;
creating, in response to the request, a record of the request to access the posted media item;
storing the record in the second identity data item; and
providing, based on the second identity data item, the record to at least one selected from a group consisting of an investigator and an administrator of the controlled facility.

10. The non-transitory computer readable medium of claim 8, wherein determining that the inmate is allowed to access the posted media item comprises:
determining that the first set of restricted attributes and the second set of restricted attributes exclude the media attribute.

11. The non-transitory computer readable medium of claim 8, wherein determining that the inmate is not allowed to access the posted media item comprises:
determining that the first set of restricted attributes and the second set of restricted attributes include the media attribute.

12. The non-transitory computer readable medium of claim 8, wherein evaluating the posted media item to identify the media attribute comprises:
processing the posted media item by a software reviewer to identify the media attribute.

13. The non-transitory computer readable medium of claim 8, wherein evaluating the posted media item to identify the media attribute comprises:
reviewing the posted media item by a human reviewer to identify the media attribute.

14. The non-transitory computer readable medium of claim 8, wherein the SSN member is at least one selected from a group consisting of an outsider and a visitor.

15. A system for reviewing a posting to a secure social network (SSN) comprising:
a database server comprising a non-transitory computer readable medium configured to store:
a first identity data item comprising a first set of restricted attributes corresponding to a SSN member, and a media attribute of a media item, and
a second identity data item comprising a second set of restricted attributes corresponding to an inmate of a controlled facility; and
an application server coupled to the database server, the application server comprising a computer processor and instructions executable by the computer processor, the instructions configured to:
receive, via a computer network comprising Internet, the media item from the SSN member, and
evaluate the media item to identify a media attribute; and
generate a posted media item based on the media item, wherein the posted media item is posted in the SSN,
receive a request to access the posted media item from the inmate of the controlled facility,
retrieve, in response to the request, and from the first identity data item of the SSN member, the first set of restricted attributes and the media attribute;
retrieve, in response to the request and from the second identity data item of the inmate, the second set of restricted attributes,
determine whether the inmate is allowed to access the posted media item based on comparing the media attribute to the first set of restricted attributes and the second set of restricted attributes;
when the inmate is allowed to access the posted media item:
grant the inmate access, via the computer network comprising Internet, to the posted media item based on the determination; and when the inmate is not allowed to access the posted media item:
deny the inmate access to the posted media item based on the determination.

16. The system of claim 15, further comprising:
an outsider application configured to:
send the posted media item to the application server.

17. The system of claim 15, further comprising:
an inmate application, executing on a computing device within the control of the controlled facility, configured to:
generate the request to access the posted media item; and
access the posted media item.

18. The system of claim 15,
wherein the instructions executable by the computer processor are further configured to:
create, in response to the request, a record of the request to access the posted media item;
store the record in the second identity data item; and
providing, based on the second identity data item, the record to at least one selected from a group consisting of an investigator and an administrator of the controlled facility.

19. The system of claim 15, wherein determining that the inmate is allowed to access the posted media item comprises:
determining that the first set of restricted attributes and the second set of restricted attributes exclude the media attribute.

20. The system of claim 15, wherein the SSN member is at least one selected from a group consisting of an outsider and a visitor.

* * * * *